(12) United States Patent
Chino et al.

(10) Patent No.: US 7,076,522 B2
(45) Date of Patent: Jul. 11, 2006

(54) INFORMATION DISTRIBUTION SYSTEM, INFORMATION DISTRIBUTION METHOD, AND COMPUTER PROGRAM FOR EXECUTING THE METHOD

(75) Inventors: Tatsuya Chino, Tokyo-to (JP); Hiroshi Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 771 days.

(21) Appl. No.: 10/069,024

(22) PCT Filed: Jun. 29, 2001

(86) PCT No.: PCT/JP01/05634

§ 371 (c)(1),
(2), (4) Date: Mar. 11, 2002

(87) PCT Pub. No.: WO02/03209

PCT Pub. Date: Jan. 10, 2002

(65) Prior Publication Data

US 2002/0152122 A1    Oct. 17, 2002

(30) Foreign Application Priority Data

Jun. 30, 2000   (JP) ............................ 2000-199393
Feb. 28, 2001   (JP) .............................. 2001-54289

(51) Int. Cl.
*G06F 15/16* (2006.01)
(52) U.S. Cl. ...................... 709/203; 703/219
(58) Field of Classification Search ............... 709/203, 709/217, 218, 219, 224
See application file for complete search history.

(56) References Cited

U.S. PATENT DOCUMENTS

| | | | | |
|---|---|---|---|---|
| 5,768,614 | A | * | 6/1998 | Takagi et al. ................... 710/1 |
| 5,912,697 | A | * | 6/1999 | Hashimoto et al. ......... 725/114 |
| 6,014,689 | A | * | 1/2000 | Budge et al. ................ 709/206 |
| 6,047,310 | A | * | 4/2000 | Kamakura et al. ........... 709/227 |
| 6,332,127 | B1 | * | 12/2001 | Bandera et al. ................ 705/14 |
| 6,351,745 | B1 | * | 2/2002 | Itakura et al. ................. 707/10 |
| 6,424,998 | B1 | * | 7/2002 | Hunter ....................... 709/207 |
| 6,430,605 | B1 | * | 8/2002 | Hunter ....................... 709/207 |
| 6,434,562 | B1 | * | 8/2002 | Pennywitt et al. ............ 707/10 |
| 6,629,136 | B1 | * | 9/2003 | Naidoo ....................... 709/219 |
| 6,725,460 | B1 | * | 4/2004 | Nishiyama et al. ........... 725/32 |
| 6,874,018 | B1 | * | 3/2005 | Wu ............................. 709/219 |

FOREIGN PATENT DOCUMENTS

EP            0727 908 A1    8/1996

(Continued)

*Primary Examiner*—Zarni Maung
*Assistant Examiner*—Van Kim T. Nguyen
(74) *Attorney, Agent, or Firm*—Oliff & Berridge, PLC

(57) ABSTRACT

An information distribution system for displaying a service information provided by an information provider from a terminal (2, 3) on at least one of a plurality of displays (4, 6), the system including: a service information collector for collecting the service information including a display information representing specific display contents and a display designation information for designating the display on which the display information is displayed; a display selector for selecting at least one of the plurality of displays (4, 6) based on the display designation information collected by the service information collector; and an information distributor for distributing the display information to the display (4, 6) selected by the display selector.

12 Claims, 28 Drawing Sheets

FOREIGN PATENT DOCUMENTS

| | | |
|---|---|---|
| EP | 0 933 941 A2 | 8/1999 |
| EP | 0 993 941 A2 | 8/1999 |
| JP | A 7-152663 | 6/1995 |
| JP | A 9-91358 | 4/1997 |
| JP | A 10-3494 | 1/1998 |
| JP | A 10-178445 | 6/1998 |
| JP | A 11-65434 | 3/1999 |
| JP | A 11-284977 | 10/1999 |
| JP | A 11-285053 | 10/1999 |
| JP | A 11-514178 | 11/1999 |

* cited by examiner

| ID | PROVIDER | FREQUENCY | DISTRIBUTION TERM | DESIRED DISTRIBUTION TIME | DISTRIBUTION CONTENTS | DESIGNATED DISPLAY |
|---|---|---|---|---|---|---|
| 0001 | A | 5 | 06/01~07/01 | 15:00~17:00 | ○○ STORE EVERYDAY FROM P.M.5:00 SALE OF △△ | STATION SQUARE A |
| 0002 | B | 3 | 06/01~07/01 | 19:00~20:00 | HAVE A NICE MEAL AT □□ | PARK B |
| 0003 | C | 4 | 06/03~06/15 | 10:00~17:00 | △△ STORE ×× PRODUCTS ON SALE | BUILDING FRONT C |
| 0004 | D | 6 | 07/01~01/15 | 10:00~17:00 | BOUTIQUE ×× NOW ON ○○ FAIR | STATION SQUARE A |
| ... | ... | ... | ... | ... | ... | ... |

FIG. 16

SERVICE INFORMATION INPUT SCREEN — G50

- DISTRIBUTION TERM: 06/01 ~ 07/01
- DISTRIBUTION FREQUENCY: 
- DISTRIBUTION TIME ZONE: ☐ MORNING ☐ AFTERNOON ☑ EVENING ☐ NIGHT
- DISTRIBUTION CONTENTS: 
- DESIGNATED DISPLAY:
  - PROJECTION SYSTEM IN PARK
  - LIQUID CRYSTAL DISPLAY IN TRAIN
  - PROJECTION SYSTEM IN STATION SQUARE

[REGISTER]

FIG.22

| ID | PROVIDER | FREQUENCY | DISTRIBUTION TERM | DESIRED DISTRIBUTION TIME | DISTRIBUTION CONTENTS | DESIGNATED DISPLAY |
|---|---|---|---|---|---|---|
| 0001 | A | 5 | 06/01~07/01 | 15:00~17:00 | ○○ STORE EVERYDAY FROM P.M.5:00 SALE OF △△ | STATION SQUARE A |
| 0002 | B | 3 | 06/01~07/01 | 19:00~20:00 | HAVE A NICE MEAL AT □□ | PARK B |
| 0003 | C | 4 | 06/03~06/15 | 10:00~17:00 | △△ STORE ×× PRODUCTS ON SALE | BUILDING FRONT C |
| 0004 | D | 6 | 07/01~01/15 | 10:00~17:00 | BOUTIQUE ×× NOW ON ○○ FAIR | STATION SQUARE A |
| ... | ... | ... | ... | ... | ... | ... |

SERVICE INFORMATION INPUT SCREEN — G50

- DISTRIBUTION TERM: 06/01 ~ 07/01
- DISTRIBUTION FREQUENCY: [ ]
- DISTRIBUTION TIME ZONE: ☐ MORNING  ☐ AFTERNOON  ☑ EVENING  ☐ NIGHT
- DISTRIBUTION CONTENTS: [ ]
- DESIGNATED DISPLAY:
  - PROJECTION SYSTEM IN PARK
  - LIQUID CRYSTAL DISPLAY IN TRAIN
  - PROJECTION SYSTEM IN STATION SQUARE

[REGISTER]

INFORMATION DISTRIBUTION SYSTEM, INFORMATION DISTRIBUTION METHOD, AND COMPUTER PROGRAM FOR EXECUTING THE METHOD

FIELD OF THE INVENTION

The present invention relates to an information distribution system for displaying a service information provided by a terminal on at least one of a plurality of displays, an information distribution method, a program for implementing the method and a computer-readable recording medium storing the program.

BACKGROUND ART

Conventionally, an enterprise which sells products or provides services distributes information on their products and services through mass media such as television and radio to advertise the products and sales.

In this case, the advertiser such as an enterprise relies on an advertising agent and the advertising agent relies on a production company etc. to produce contents relating to the products and services, which is periodically displayed on television etc. to advertise the products and services.

However, according to conventional advertisement, such information on products and services is only limited to repetition of a predetermined contents, and it is difficult to provide information that the information provider wishes to provide in a timely manner.

Further, since the advertisement is arranged through advertising agents, production companies and television stations etc., it takes considerable time for the actual contents of the information to be displayed on the television etc., so that, especially, it is impossible to directly provide a time-limited bargain information of super market etc. to consumers.

Further, since such conventional advertisement involves a plurality of companies, considerable expenses are required and payment thereof can be complicated.

DISCLOSURE OF THE INVENTION

An object of the present invention is to provide an information distribution system enabling an information provider such as an advertiser to provide information on their products and services to consumers in a timely and simple manner, an information distribution method, a computer program for implementing the method and a computer-readable recording medium storing the program.

In order to achieve the above object, an information distribution system according to an aspect of the present invention displays a service information provided by an information provider from a terminal on at least one of a plurality of displays, the system including: a service information collector for collecting a service information including a display information representing specific display contents and a display designation information for designating the display on which the display information is displayed; a display selector for selecting at least one of the plurality of displays based on the display designation information collected by the service information collector; and an information distributor for distributing the display information to the display selected by the display selector.

The display refers to an image display and multimedia information display installed in public space etc., which may be, for instance, large-size PDP (Plasma Display Panel) installed at station square, a projection system for forming projection image on building exterior and windows, and liquid crystal display installed inside of transport facilities such as train and bus.

The present invention may be arranged as a network system having a terminal device for providing the information by providers, a terminal device annexed to the display and a server computer, the service information collector, the display selector and the information distributor preferably be set in the server computer.

According to the above arrangement, since the service information collector is provided, the display information relating to the products and service provided by the information provider can be collected in a timely manner. Since the image display for displaying the display information is selected by the display selector based on the display designation information transmitted by the information provider, the advertisement screen can be directly displayed on the image display designated by the information provider, so that timely advertisement is possible with minimum costs.

Since the information distribution system is a network system including the network such as the Internet, the accounting system ordinarily used in the Internet etc. can be used, thereby avoiding troublesome charge payment and facilitating usability of the system for the information provider.

In the above, the information distribution system may preferably include a service information processor for processing the service information to generate image information in order to display an image on the selected display.

When the information provider outputs, for instance, a display information composed only of characters such as text data, the service information processor creates images by disposing the display information composed of characters in a predetermined form on a predetermined screen and sets a background picture as required and preparing animation by applying live-action effect.

Since the service information processor is provided, the information provider can obtain contents with strong advertisement effect attached with background and animation only by transmitting character data such as text data and image file so that the usability of the information distribution system can be enhanced.

When the information distribution system includes an information attribute collector for collecting an information attribute of the service information, the display selector may preferably select the display to which the service information is distributed based on the information attribute collected by the information attribute collector.

The information attribute means attribute for the information provider to intentionally transmit to a certain party, which may be, for instance, attribute based on profession such as student and housewife or user such as ages, sexes, annual income and sensitivity, or an attribute based on time and place such as user gathering at a predetermined place at a predetermined time.

Since the information provider can appropriately provide information to users to whom the information provider wishes to provide information at necessary place and time by selecting the image display based on the information attribute collected by the information attribute collector, efficient information distribution is possible. Since the information attribute collector is provided, the information can be transmitted directly to the mobile terminal held by the users based on the collected attribute.

When the above information distribution system has a display location information collector for collecting location information of the plurality of displays, the display selector may preferably select the display to which the service information is distributed based on the location information of the display collected by the display location information collector.

Since the display location information collector for collecting the location information of the display is provided, the information can be provided using appropriate image display according to users to whom the information provider wishes to provide the information considering current location information of the image display. Accordingly, not only the fixed image displays placed at public space etc. but the movable image display installed in traffic facilities such as bus and train can be incorporated in the present system, so that appropriate information can be distributed to the moving users in the traffic facilities, thus greatly enhancing convenience of the system.

Further, since the location of the display can be checked on the server side by providing the display location information collector, the registration and management of the display incorporated in the present system can be facilitated.

When the above information distribution system has a location information storage for storing the location information collected by the display location information collector, the display selector may preferably select the display based on the location information stored in the location information storage.

Since the display selector selects the image display based on the location information of the image display stored in the location information storage for storing the location information, the information can be distributed and displayed on the image display corresponding to the condition designated by the information provider, thus further enhancing convenience for the information provider.

Since the location information of the respective displays collected by the display location information collector is stored in the location information storage, data process flow in the server can be unified, thus simplifying structure inside the server and process thereof.

In the above information distribution system, the terminal on which the information provider inputs information may preferably be a mobile terminal which can be held and moved by the information provider.

The mobile terminal may be mobile terminal such as a cellular phone having web browser function and e-mail transmission function, and PDA (Personal Digital Assistants) connectable with a communication line.

Since the information can be provided by the mobile terminal, the information provider can freely distribute contents without being restricted by time and place, so that the usability of the information distribution can be further enhanced.

The present invention is not only arranged as above-described system, but may be arranged as an information distribution method having service information collecting step, display selecting step, and information distribution step, a computer-readable recording medium storing a program for implementing the method and as a program for implementing the method, whereby the same functions and effects as described above can be obtained.

According to the information distribution method of the present invention, the respective steps are not necessarily be implemented by a single computer etc. constituting the network, but the respective steps may be conducted with a plurality of computers. Further, according to the computer-readable recording medium and the computer program of the present invention, since the commercial computers can be used to construct the system the applicability of the present invention can be greatly improved.

In order to more efficiently implement the present invention, an information distribution system according to an aspect of the present invention is characterized in including a display operation designation information in the service information from the information provider and a display program generator for generating a display program of the display designated by the display designation information based on the display operation designation information.

Specifically, an information distribution system according to another aspect of the present invention is for displaying a service information provided by an information provider from a terminal on at least one of plurality of displays, the service information including a display information representing specific display contents, a display designation information for designating the display on which the display information is displayed and a display operation designation information for specifying the display operation of the display designated by the display designation information, the system including: a service information collector for collecting the service information; a display program generator for generating a display program of the display designated by the display designation information based on the display operation designation information; and a display program executor for displaying the service information on the designated display based on the display program generated by the display program generator.

The display operation designation information is information for specifying how the information provider display the service information on the display, which may be information specifying month, day and time and frequency for the service information being displayed on the terminal by the information provider.

The display program generator prepares the display program designating on what timing the display information is displayed on the display, i.e. the time schedule, and the display program executor displays the display information based on the time schedule.

According to the present invention, since the information distribution system has the display program generator and the display program executor, the display program generator generates the display program according to date, time and frequency designated by the information provider, based on which the display program executor displays the service information provided by the information provider such as advertisement on the image display. Accordingly, the information relating to services etc. can be provided to consumers in a timely and convenient manner, thus enabling the information provider to conduct more efficient advertisement.

In the above, when the information distribution system is constructed as a network system including a display controller annexed to the respective display and a server connected to the respective display controller through the network, though the service information collector, the display program generator and the display program executor may be concentrated on the server, a display program distributor for distributing the display program generated by the display program generator to the display may preferably be provided to the server and the display program executor may preferably be provided to the display controller.

Since the display program executor is provided to the display controller, it is only required for the server to distribute the display program and the display information to the respective display controllers in order to automatically display the display information on the respective image displays according to the display program thereafter, thus reducing the burden on the server to display service information in a more efficient manner.

When the display controller has the display program executor, the display controller may preferably have a display information storage for storing the display program and the display information distributed by the server.

Since the display controller has the display information storage, the information distributed by the server can be stored in the display information storage, so that repetition of information display based on the same display program and display information can be automatically processed within the display controller after once distributing information from the server, thus reducing communication frequency with the server of the network and conducting efficient network communication.

When the display controller has the display information storage, the system can be further rationalized by storing the display information in the display information storage as follows.

(1) A registration request distributor for distributing a request to register the display information contained in the service information when the service information is collected by the service information collector may be provided in the server, and the display program executor of the respective display controllers may be provided with a display information finder for searching a corresponding display information from the display information stored in the display information storage in response to the registration request by the registration request distributor and an information transmission requesting portion for requesting transmission of the display information to the server when the corresponding display information is not found after searching by the display information finder.

According to the above arrangement, when a new display information is provided from an information provider, the registration request distributor of the server distributes the registration request to the respective display controllers. The respective display controllers searches the display information storage thereof to determine whether the display information has been stored or not, and only when the display information has not been found, the display controllers request to transmit the display information from the information transmission requesting portion to the server.

(2) The display program executor of the display controller may include a display information finder and an information transmission requesting portion as in the above, and, when the display program is distributed, the display information finder searches the display information stored in the display information storage, so that, when there is no corresponding display information, the information transmission requesting portion may request transmission of the display information to the server.

Since the display program executor includes the display information finder and the information transmission requesting portion, the display program executor requests information transmission to the server only when there is not a desired display information in the display information storage, thus minimizing communication between the display-side terminal computer and the server so that the network communication can be made further efficient.

Further, as well as the display program executor, the above display controller may preferably include a base contents displaying portion for displaying a predetermined base contents when there is no display information based on the display program.

The display program may preferably be arranged so that, when a predetermined display information line is displayed, for instance, from 9:00 to 9:15 and another display information line is displayed from 9:15 to 9:30, the total time for the display information to be displayed in the respective display information lines may preferably set about thirteen to fourteen minutes, i.e. less than fifteen minutes, in order to prevent the last part of the display information from being not displayed on account of shift in timing etc.

By providing the base contents displaying portion, the gap between the above display information lines can be filled with the base contents, so that some information can be displayed on the display.

The information distribution system according to the above claims 14 to 19 may be constructed as an information distribution method, a program for implementing the method and a recording medium storing the program, whereby the same function and effect can be obtained as in the above. Further, since general computers and displays can be used to construct the system, the applicability of the present invention can be greatly improved.

BRIEF DESCRIPTION OF THE DRAWINGS

FIG. 12 is a conceptual illustration representing a service information stored in a service information storage according to the aforesaid embodiment;

FIG. 16 is an example of a displayed screen formed by the information distribution system according to the aforesaid embodiment;

FIG. 22 is a conceptual illustration representing a service information stored in a service information storage according to the aforesaid embodiment;

FIG. 26 is an example of a displayed screen formed by the information distribution system according to the aforesaid embodiment;

THE BEST MODE FOR CARRYING OUT THE INVENTION

Preferred embodiments of the present invention will be described below with reference to attached drawings.

[1] First Embodiment

[Arrangement of Information Distribution System]

Figure 1:
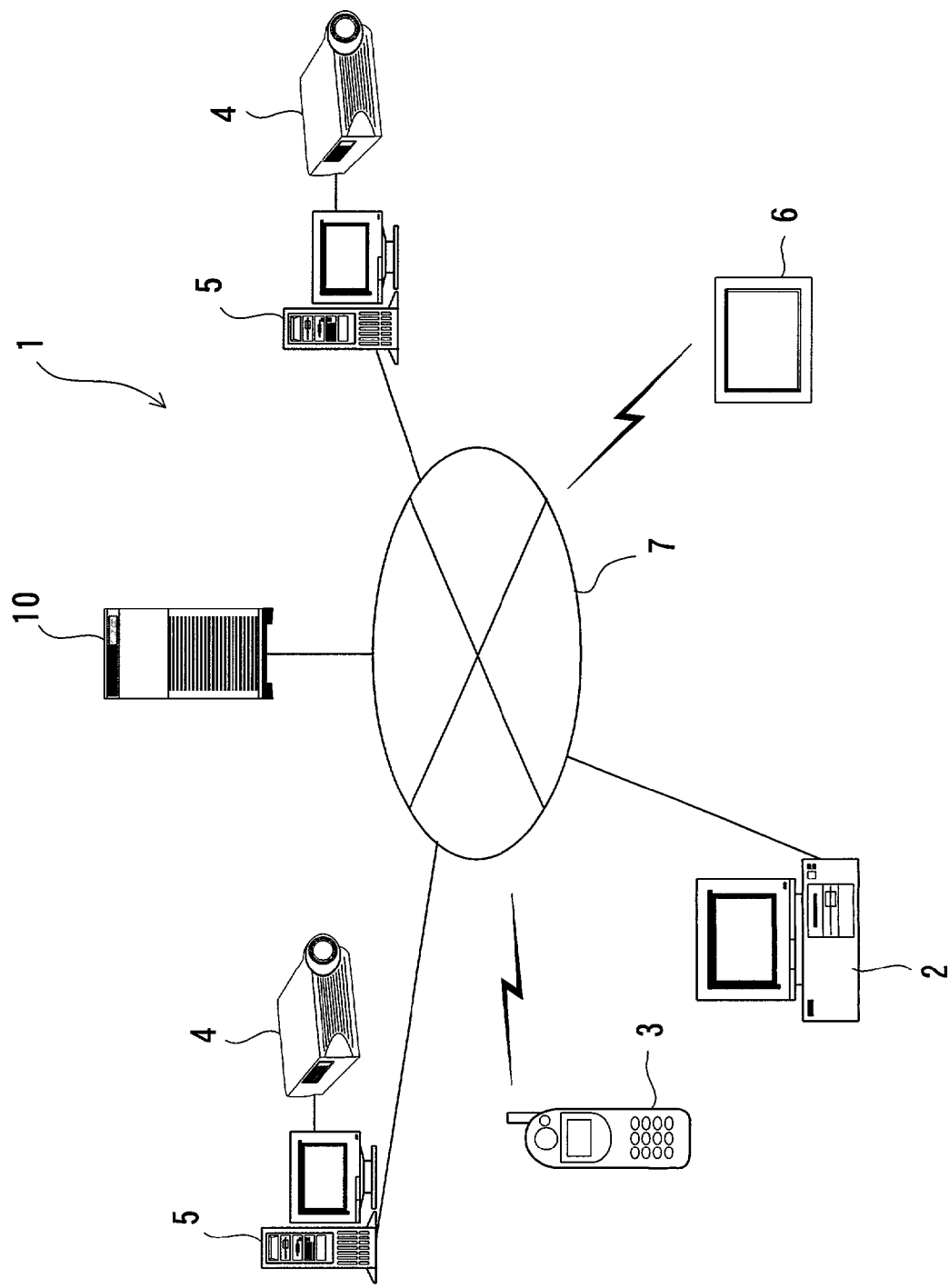
FIG. 1 is a schematic view showing a network setup of an information distribution system according to a first embodiment of the present invention.

FIG. 1 shows an information distribution system 1 according to the first embodiment, the information distribution system 1 including an information terminal computer 2, a mobile terminal 3, an image display 4, a terminal computer 5 annexed to the image display 4, an image display 6 and a server 10, which are connected via network 7 such as the Internet.

The service terminal computer 2 and the mobile terminal 3 are devices in which information provider who wants to transmit information such as advertisement inputs service information in order to sell products and provide services.

The service terminal computer 2 includes a processor such as CPU (Central Processing Unit) and memory, and a web browser on an OS (Operating System) for controlling the operation of the CPU is installed therein. Though not shown, the service terminal computer 2 is connectable with the network 7 through a public line by a modem etc, so that the information provider uses a service information collector 14 (described below) provided on the server 10 with the web browser.

On the other hand, the mobile terminal 3 is a cellular phone etc. having electronic mail transmitting function and web access function. When the mobile terminal 3 has the electronic mail transmitting function, after an electronic mail is prepared by operating the cellular phone, the mobile terminal 3 is connected to the network. Subsequently, the calling signal from the cellular phone is received by, though not shown, a radio base station connected with the network 7, thereby transmitting the electronic mail to the service information collector 14 of the server 10 through the network 7. When the mobile terminal 3 has web access function, the mobile terminal 3 connects with the server 10 using the web access function of the cellular phone. When "input of service information" displayed on a menu of the server 10 is selected, the service information collector 14 is executed, and the service information input screen is displayed on the screen of the mobile terminal 3, so that the information can be inputted thereon. After completion of input, a register button is pressed.

The image display 4 and the terminal computer 5 are constructed as a projection system installed at a public space such as station and park. The information outputted from the server 10 enters to the terminal computer 5 through the network 7, modem etc. to be displayed on the image display 4 as a large-size projection image.

The image display 6 is arranged as a liquid crystal display etc. installed in a public traffic facilities such as train and bus, which displays the distribution information outputted from the server 10 as in the image display 4. Incidentally, the image display 6 periodically outputs its location information to the server 10. Though described below in detail, the image display 6 periodically outputs its current location information to the server 10 through the network 7 using a communication system of, for instance, the traffic facilities.

Figure 2:
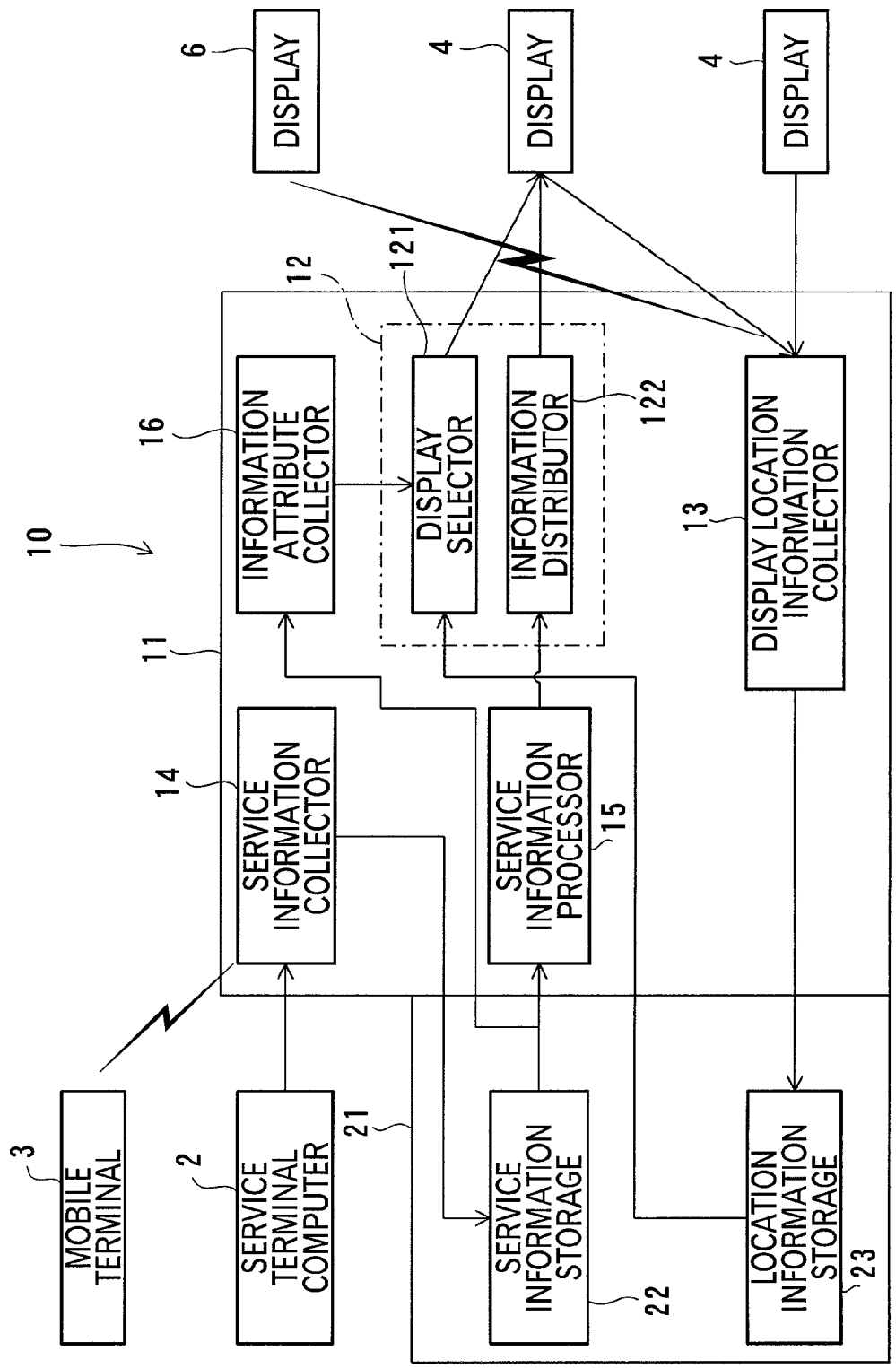
FIG. 2 is a block diagram showing an arrangement of a server composing the information distribution system according to the aforesaid embodiment.

As shown in FIG. 2, the server 10 has a CPU 11 and a storage 21, and includes a distribution information output 12, a display location information collector 13, a service information collector 14, a service information processor 15 and an information attribute collector 16 arranged as a program on a OS having multitask function for controlling operation of the CPU 11 and a service information storage 22 and a location information storage 23 in the storage 21.

The distribution information output 12 has a display selector 121 and an information distributor 122. The display selector 121 selects the image displays 4 and 6 based on a display designation information contained in the service information from the information providers or an information attribute obtained by the information attribute collector 16 (described below). The information distributor 122 distributes specific contents as a distribution information to be provided to the selected image displays 4 and 6. Incidentally, the distribution information output 12 can distribute the information not only to the image displays 4 and 6 selected by the display selector 121, but directly to the mobile terminal 3. The mobile terminal 3 to which the information is distributed is selected according to the information attribute collected by the below-described service information collector 14.

The display location information selector 13 collects location information of the image display 6 installed in the traffic facilities such as bus and train. The display location information collector 13 periodically collects location information of the image display 6 because the image display 6 moves with the train, bus etc., so that the location information is collected at an interval of approximately five minutes. The location information of the image display 6 can be obtained by seeking the location information of the traffic facilities from the management system for managing the operation of the traffic facilities. However, GPS (Global Positioning System) function and radio transmission function may be provided to the image display 6, so that its location information is periodically outputted. Incidentally, radio transmission may be directly conducted, or alternatively, the network such as the cellular phone may be used to output to the server 10 through the network 7.

The service information collector 14 collects service information which the information provider inputs using the service terminal computer 2 or the mobile terminal 3. The service information inputted by the information provider is, for instance, specific distribution contents to be the display information, desired distribution date and time of the contents, display designation information designating the image display 4 and 6 on which the information is displayed, and information attribute specifying the contents of the distribution information and the party such as housewife, student and businessman to whom the information is distributed.

The service information processor 15 modifies the distribution contents stored in the below-described service information storage 22 by adding image information thereon to provide more attracting contents. The information attribute collector 16 collects the information attribute of the service information collected by the service information collector 14 and outputs the collected information attribute to the display selector 121. The information attribute is collected from the service information storage 22 in distributing the information.

Figure 3:
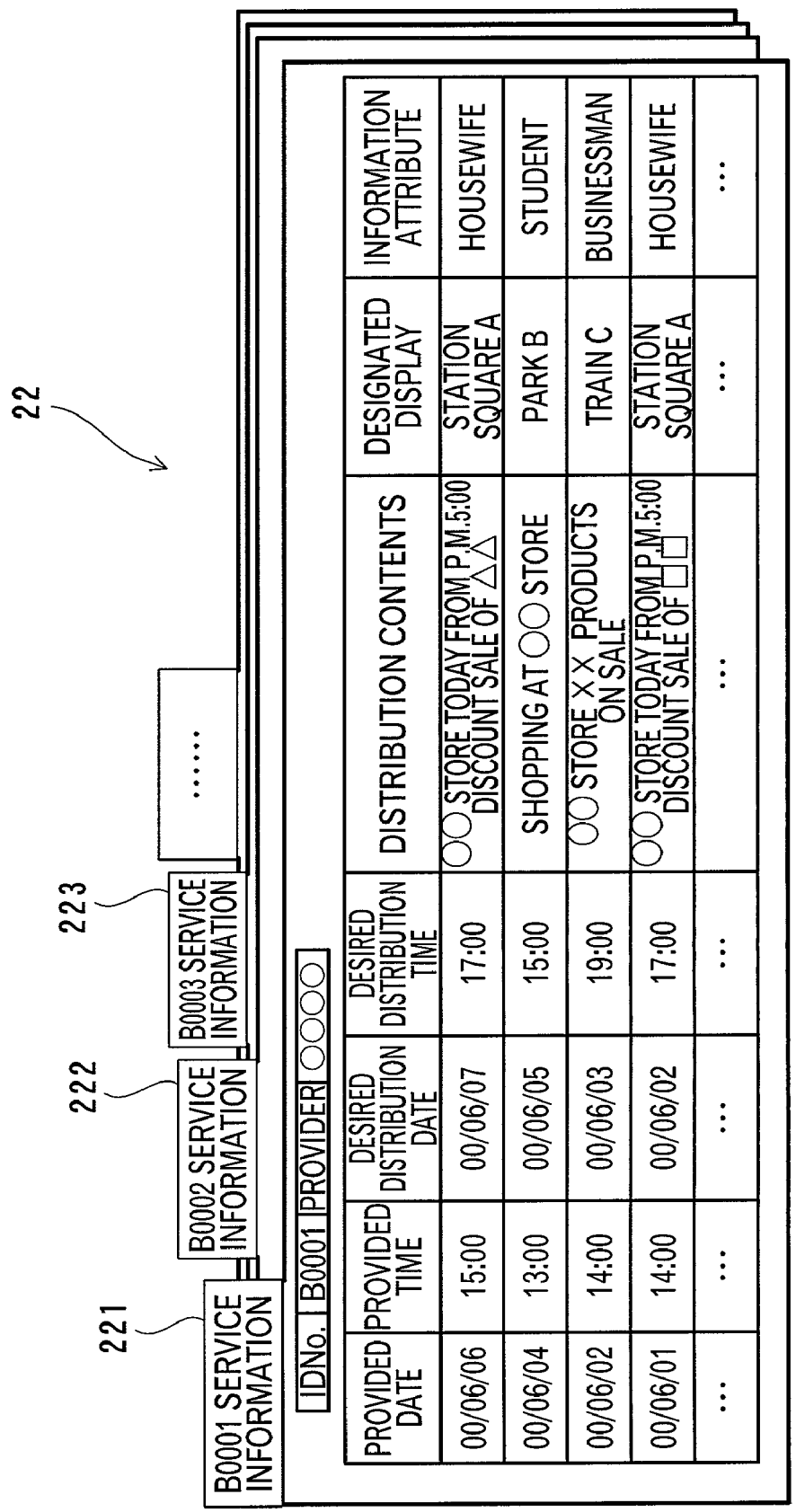
FIG. 3 is a conceptual illustration representing a service information stored in a service information storage according to the aforesaid embodiment.

The service information storage 22 stores the distribution contents from the information provider collected by the service information collector 14, which is constructed as a database having tables 221, 222, 223 . . . for each information providers, as shown in FIG. 3.

The information stored in the respective tables 221, 222, 223 . . . includes the distribution contents, desired distribution date and time, display designation information and information attribute.

Figure 4:
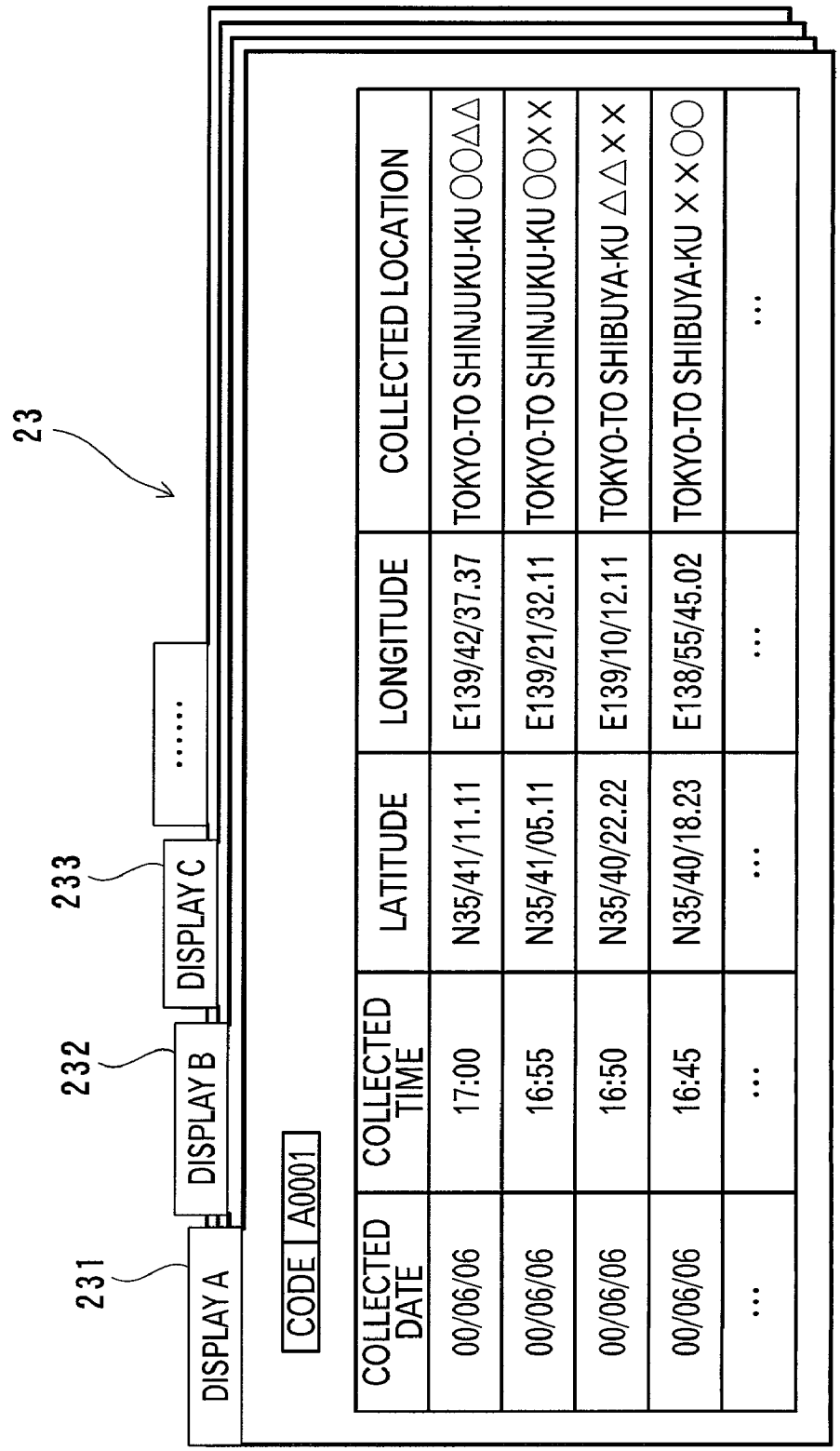
FIG. 4 is a conceptual illustration representing a location information stored in a service information storage according to the aforesaid embodiment.

The location information storage 23 stores the display location information collected by the display location information collector 13, which is constructed as tables 231, 232, 233 . . . corresponding to the image display 6 as shown in FIG. 4. Incidentally, since only one movable image display is provided in FIGS. 1 and 2, only the single table 231 is required. When the movable image display 6 becomes plural, the tables 232, 233 . . . may be additionally increased.

The information stored in the table 231 includes data collection date and time, latitude and longitude at the date and time, and collected location information at the date and time. Such information may be obtained by obtaining transmitted output of the latitude and longitude of the image display 6 obtained by GPS function, or by obtaining collected location information calculated by the operation management system of the above-described traffic facilities.

[Function of Information Distribution System]

Next, a function of the information distribution system 1 will be described below. Since the function of the information distribution system can be roughly classified into collection of service information, collection of display location information, and distribution of the service information, which are independently conducted using multitask function of the OS, the respective functions will be separately described.

(1) Collection of Service Information

Figure 5:
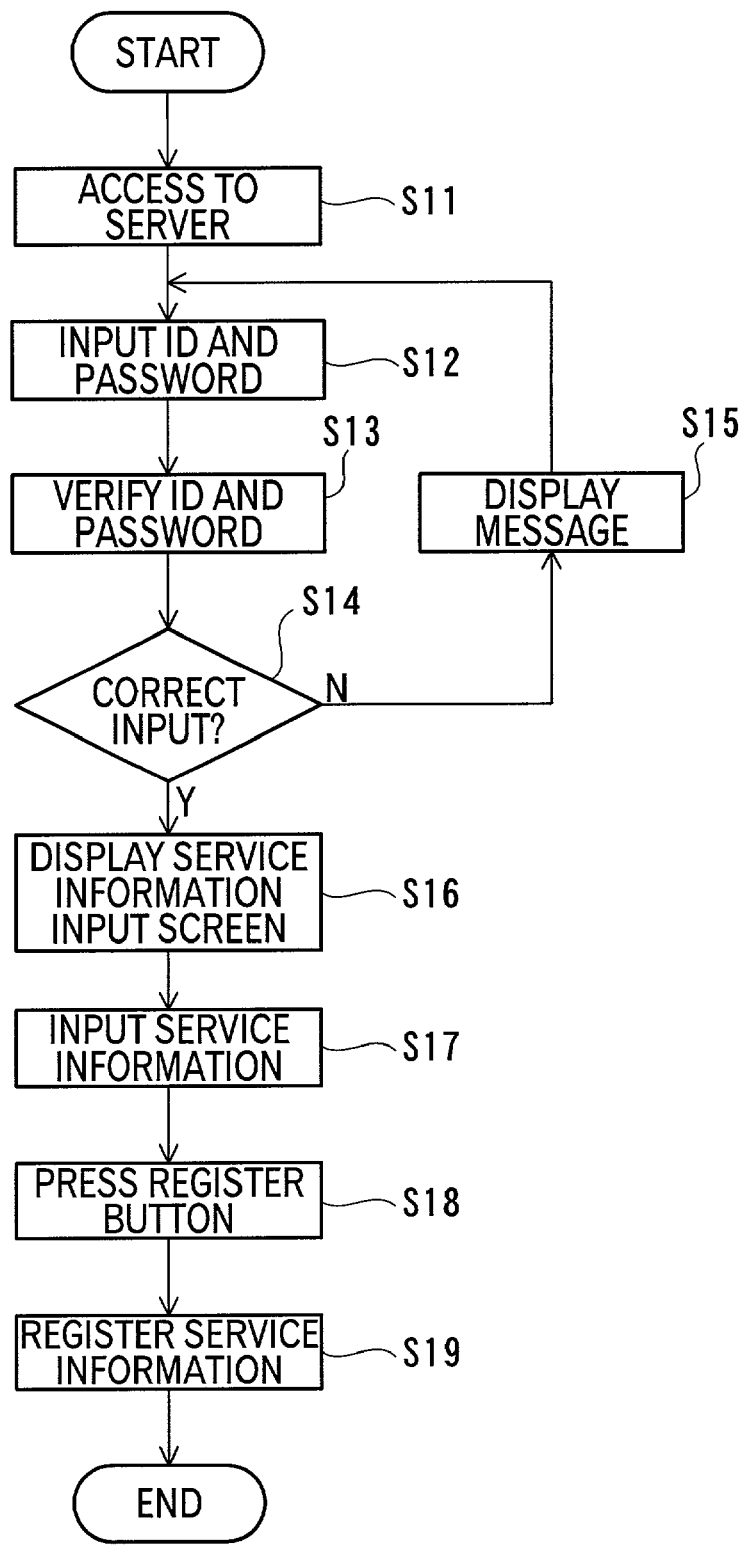
FIG. 5 is a flowchart for illustrating a function of the information distribution system according to the aforesaid embodiment.

The service information is collected according to flowchart shown in FIG. 5. The service terminal computer 2 and the mobile terminal 3 may be used as a device for outputting the service information operated by the information provider. The input operation from the service terminal computer 2 is conducted as follows.

Initially, the information provider starts the web browser of service terminal computer 2 to access the server 10 (step S11). When the server 10 is accessed, a screen requesting input of ID and password of the information provider is displayed. When the information provider enters his ID, password, and name or corporate name (step S12), the service information collector 14 confirms input of the ID and the password (step S13) and judges whether the ID etc. is right or not (step S14). If the ID etc. is wrong, the service information collector 14 displays a message to the effect on the service terminal computer 2 (step S15) and displays a screen requesting to re-enter the ID and password.

Figure 6:
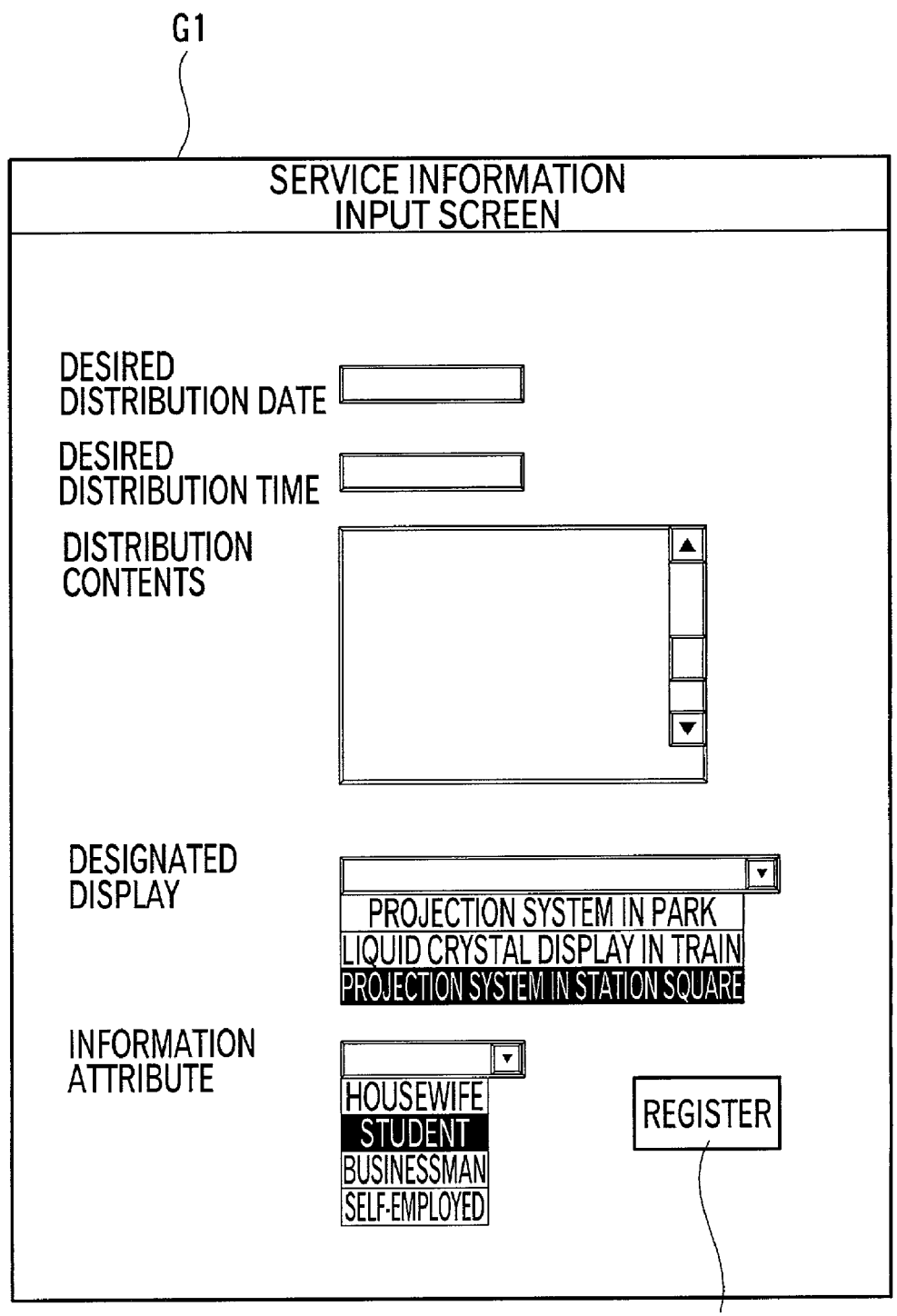
FIG. 6 is an example of a displayed screen formed by the information distribution system according to the aforesaid embodiment.

On the other hand, when the service information collector 14 judges that right ID and password are inputted, a service information input screen G1 is displayed as shown in FIG. 6 (step S16) and the information provider inputs the service information according to the input screen G1 (step S17: service information collecting step). Specifically, the information provider inputs desired distribution date and time, contents of the service information, designation of the image display 4 and 6 the information is displayed and information attribute of the distributing party as shown in FIG. 6. The image displays 4 and 6 are designated according to the selection of the information provider among the options such as "projection system in park", "liquid crystal display in train" and "projection system in station square" on the input screen GI. The information attribute is also selected by the information provider among the options such as "housewife", "businessman", "student" and "self-employer".

When the input operation is completed, the information provider presses a register button G11 after confirming the registered contents are correct (step S18). When the register button G11 is pressed, the service information collector 14 stores the service information entered on the input screen GI into the service information storage 22 as a text information (step S19: service information storing step). Specifically, the public information collector 14 sets one table such as the table 221 shown in FIG. 3 based on the ID number of the information provider, where the date and time when the register button G11 is pressed as an information upload time, desired distribution date and time, display designation information and information attribute are stored in one record as a text data.

Incidentally, in order to input the service information by the mobile terminal 3 having an e-mail function, the above service information is prepared as a text data and is transmitted as an e-mail using the e-mail function of the mobile terminal 3 to the service information collector 14. The service information collector 14 receiving the e-mail analyzes the contents of the e-mail and stores the information in the service information storage 22.

When the service information is inputted by the mobile terminal 3 having a web access function, the mobile terminal 3 is operated to input information in approximately the same manner as the above-described service terminal computer 2.

(2) Collection of Location Information

Figure 7:
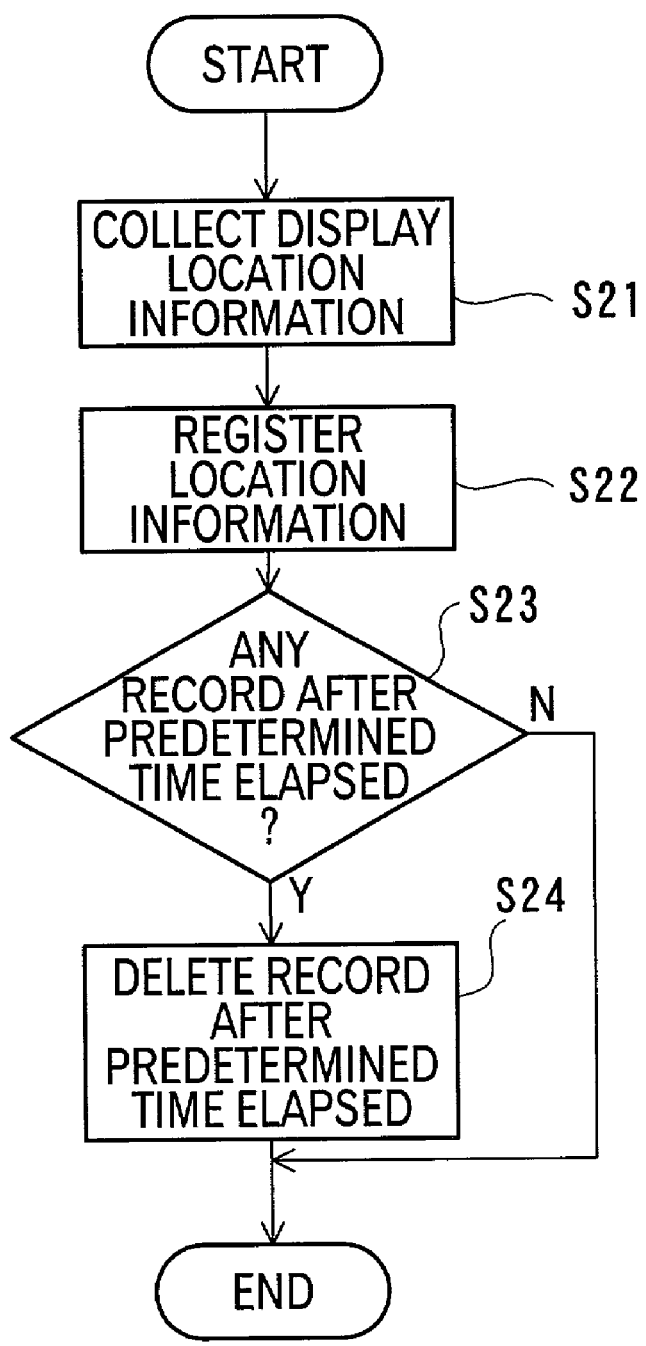
FIG. 7 is a flowchart for illustrating an operation of the information distribution system according to the aforesaid embodiment.

The location information will be collected based on the flowchart shown in FIG. 7.

Initially, the display location information collector 13 collects the current location information of the moving image display 6 based on radio signal outputted by the image display 6 and the location information outputted by the management system of the moving means (step S21: display location information collecting step).

The display location information collector 13 registers the collected location information in the location information storage 23 (step S22: location information storing step). Specifically, the display location information collector 13 sets the table 231 corresponding to the image display 6 as shown in FIG. 4 and registers current location information corresponding to a predetermined date of the image display 6 as one record. Incidentally, though the latitude and longitude information and location (address) information are recorded as the current location information in the present embodiment, the location of public space such as station adjacent to the mobile terminal may alternatively be registered.

The display location information collector 13 determines whether a predetermined time, e.g. two hours, has passed since the record of the current location registered in the table 231 of the location information storage 23 was collected (step S23), and sequentially deletes records with a predetermined time elapsed (step S24). The sequential operations are continuously repeated while the server 10 is on service approximately for every five minutes interval and the current location information of the image display 6 is renewed for every five minutes interval.

(3) Distribution of Service Information

Figure 8:
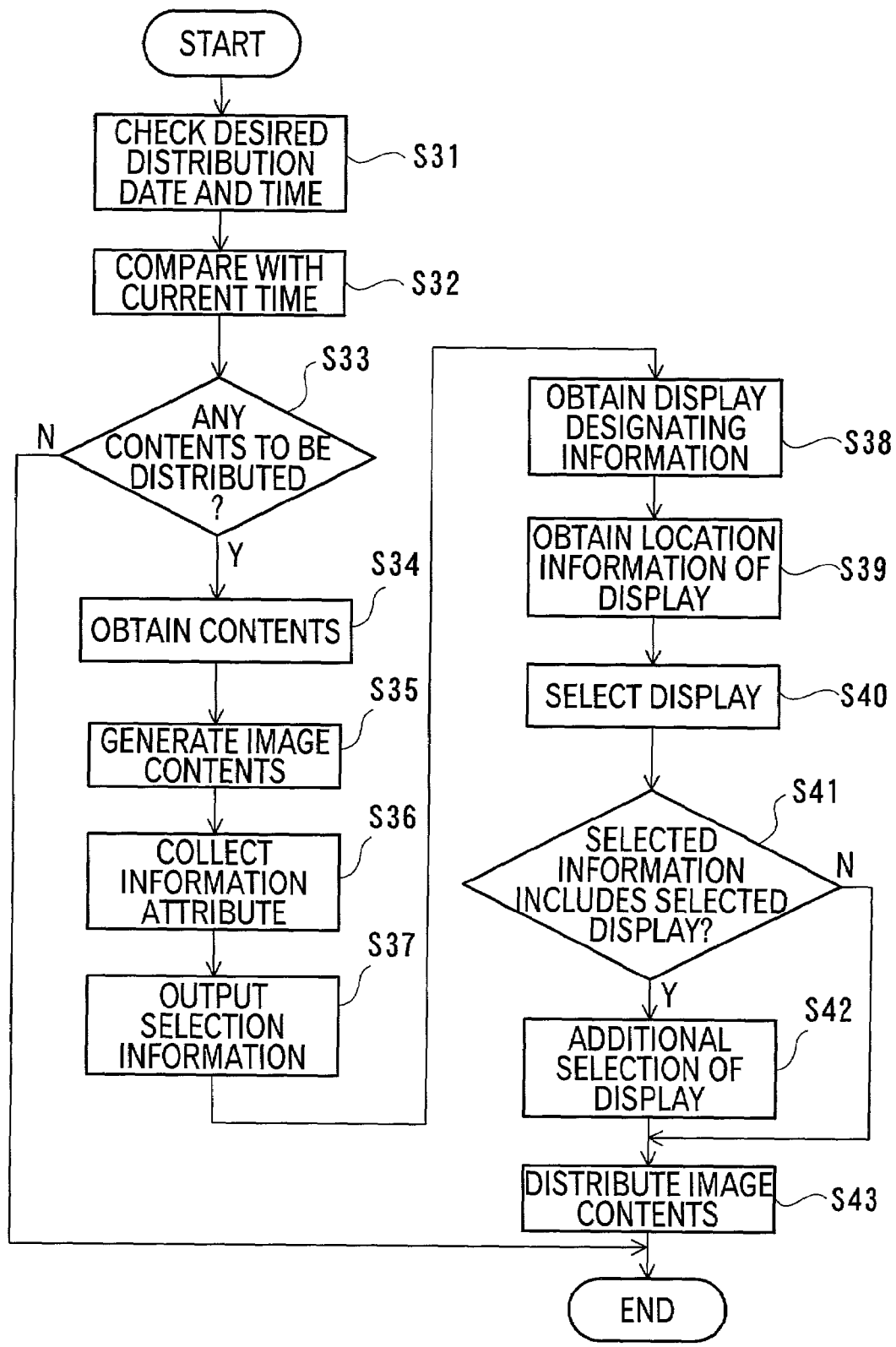
FIG. 8 is a flowchart for illustrating an operation of the information distribution system according to the aforesaid embodiment.

The service information is distributed according to a flowchart shown in FIG. 8.

Initially, though not shown in FIG. 2, the distribution information output 12 periodically checks the desired distribution date and time of the service information registered in the service information storage 22 (step S31). The distribution information output 12 compares the current date and time detected by internal clock etc. with the desired distribution date and time (step S32) to determine whether the distribution contents corresponding to the desired distribution time exist or not (step S33).

When such distribution contents exist, the service information processor 15 fetches the corresponding distribution contents from the service information storage 22 (step S34).

Figure 9:
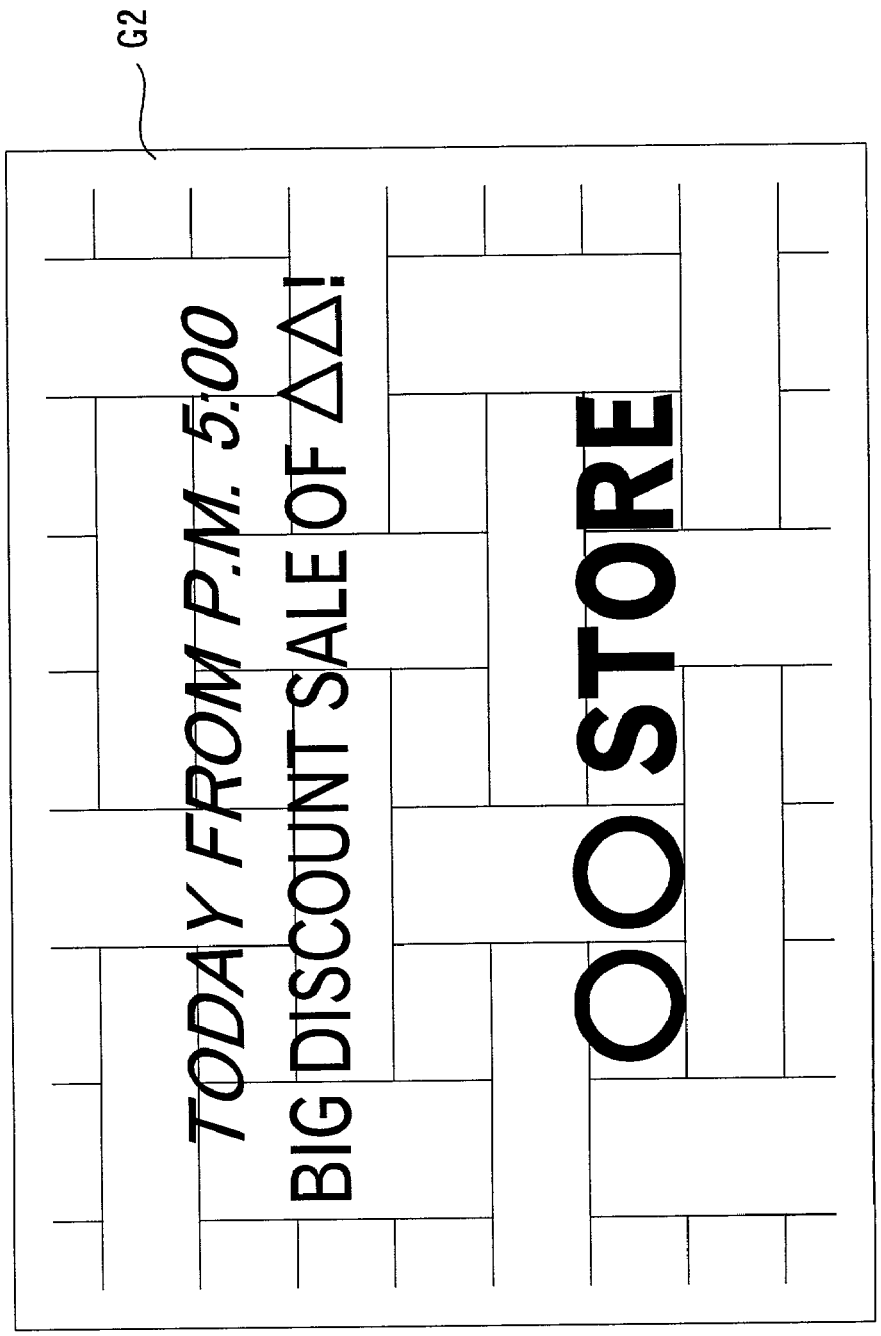
FIG. 9 is an example of image contents formed by the information distribution system according to the aforesaid embodiment.

The service information processor 15 modifies the distribution contents composed of text data registered in the table to prepare image contents as an image information to be displayed on the image displays 4 and 6 (step S35: service information processing step). Specifically, the contents "today from PM 17:00 big discount sale of ∆∆, ○○store" shown in FIG. 4 is modified into image contents G2 having background pattern shown in FIG. 9 by changing character size, typeface and layout thereof. Incidentally, the service information processor 15 can also create an animation by applying live-action effect to the contents.

The service information processor 15 can further process the distribution contents in the service information stored in the service information storage 22 in accordance with selection result of the image displays 4 and 6 by the above-described image selector 121 as required. For instance, when an information relating to a plurality of stores is contained in the distribution contents, the image contents are prepared by deleting the information on stores located not adjacent to the image display 4 selected by the display selector 121.

The information attribute collector 16 obtains the information attribute stored in the service information storage 22 (step S36: information attribute collecting step), selects on which image displays the information is displayed based on the obtained information attribute, and outputs the information on the display selector 121 relating to the selected image displays 4 and 6 to the display selector 121 (step S37).

The display selector 121 fetches the display designation information stored in the service information storage 22 (step S38) and fetches the current location information of the image display 6 stored in the location information storage 23 (step S39). During selection by the display selector 121, the image displays 4 and 6 designated by the display designation information are selected considering the current location information of the image display 6 (step S40).

Next, the display selector 121 compares the selected image displays 4 and 6 with the selection information of the image displays 4 and 6 obtained from the information attribute collector 16 (step S41). When there is difference between the selected image displays 4 and 6 and the selection information, the image displays 4 and 6 included in the selection information and adjacent to the selected image displays 4 and 6 are additionally selected (step S42). In other words, the image displays 4 and 6 not designated by the information provider but installed on a place with many people to whom the information provider wishes to distribute the information gathered around are additionally selected.

After completing preparation of the image contents G2 by the service information processor 15 and the image displays 4 and 6 are selected by the display selector 121, the information distributor 122 distributes the image contents G2 to the selected image displays 4 and 6 (step S43: information distribution step).

[Effect of Embodiment]

According to the above-described first embodiment, following effects can be obtained.

Since the service information collector 14 is provided, the display information relating to the products and services provided by the information provider can be collected in a timely manner. Since the image displays 4 and 6 for displaying the display information is selected by the display selector 121 before distribution based on the display designation information transmitted by the information provider, the advertisement screen can be directly displayed on the image displays 4 and 6 designated by the information provider, so that timely advertisement is possible with minimum costs.

Since the information distribution system 1 is a network system including the network 7 such as the Internet, the accounting system ordinarily used in the Internet etc. can be used, thereby avoiding troublesome charge payment and facilitating usability of the system for the information provider.

Since the service information processor 15 is provided, the information provider can obtain contents with strong advertisement effect attached with background and animation only by transmitting character data such as text data, so that the usability of the information distribution system can be enhanced.

Since the information provider can appropriately provide information to users to whom the information provider wish to provide information at necessary place and time by selecting the image displays 4 and 6 based on the information attribute collected by the information attribute collector 16, efficient information distribution is possible. Especially, since the image displays 4 and 6 selected by the information attribute collector 16 are added in selecting the image displays 4 and 6 as described above, advertisement is efficiently distributed without omission even when the information provider mistakenly forecasts.

Since the display location information collector 13 is provided, the information can be provided using appropriate image displays 4 and 6 according to users for the information to be provided by the information provider considering current location information of the image display 6. Accordingly, not only the fixed image displays 4 placed at public space etc. but also the movable image display 6 installed in traffic facilities such as bus and train can be incorporated in the present system, so that appropriate information can be distributed to the users in the traffic facilities while moving, thus greatly enhancing convenience of the system.

Since the display selector 121 selects the image display 6 based on the location information of the image display 6 stored in the location information storage 23 for storing the location information, the information can be distributed and displayed on the image displays 4 and 6 corresponding to the condition designated by the information provider, thus further enhancing convenience for the information provider.

Since the location information of the respective displays collected by the display location information collector 132 is stored in the location information storage 23, data process flow in the server 10 can be unified, thus simplifying structure inside the server 10 and process thereof.

[2] Second Embodiment

Next, second embodiment of the present invention will be described below. Incidentally, the same reference numeral will be attached to components previously described, thus omitting and simplifying description thereof.

[Arrangement of Information Distribution System]

Figure 10:
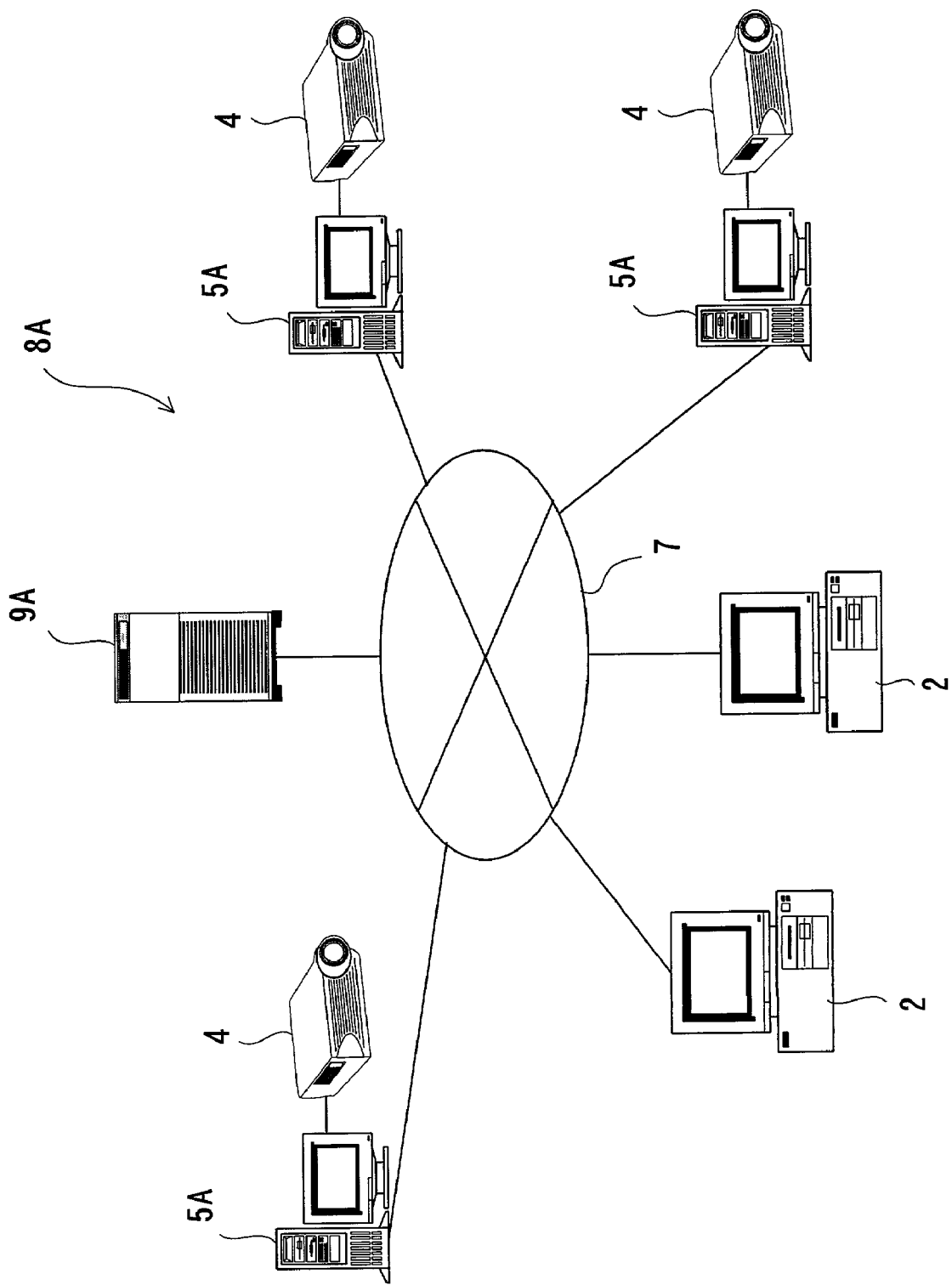
FIG. 10 is a schematic view showing a network setup of the information distribution system of a second embodiment of the present invention.

FIG. 10 shows an information distribution system 8A according to the second embodiment. The information distribution system 8A includes a service terminal computer 2, an image display 4, a display-side terminal computer 5A, a network 7 and server 9A as in the network system of the first embodiment. Incidentally, though the mobile terminal 3 and the movable image display 6 in the first embodiment are not shown as components of the present system (see FIG. 1), these components are omitted for the convenience of explanation, and can be incorporated as components of the system as in the first embodiment.

Figure 11:
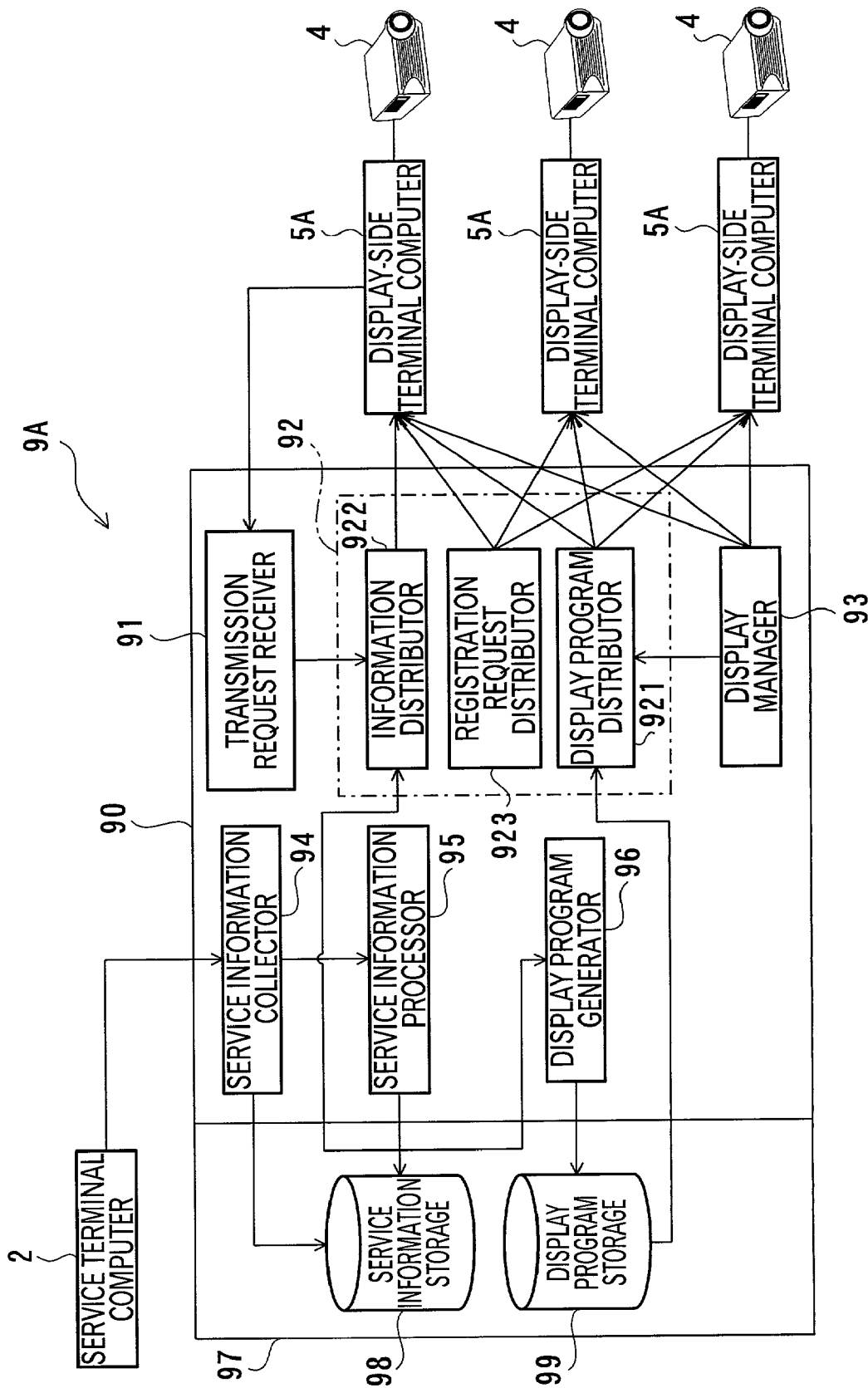
FIG. 11 is a block diagram showing an arrangement of a server composing the information distribution system according to the aforesaid embodiment.

As shown in FIG. 11, the server 11 has a CPU 90 and a storage 97, and further includes a transmission request receiver 91, a distribution information output 92, a display manager 93, a service information collector 94, a service information processor 95 and a display program generator 96 arranged as a program on the OS having multitask function for controlling the operation of the CPU 90, and a service information storage 98 and a display program storage 99 set in the storage 97.

The transmission request receiver 91 receives contents distribution request from the below-described display-side terminal computer 5A.

The distribution information output 92 has a display program distributor 921, an information distributor 922 and a registration request distributor 923. The display program distributor 921 transmits display program, i.e. a time schedule, of the respective displays 4 to the respective display-side terminal computers 5A connected through the network 7.

The information distributor 922 distributes specific contents to the image display 4, which establishes connection between the display-side terminal computer 5A and the server 9A in response to the request from the display-side terminal computer 5A received by the transmission request receiver 91 and urges the display-side terminal computer 5A to download the information stored in the server.

The registration request distributor 923 distributes the registration request for registering the display information newly stored in the respective display-side terminal computers 5A when a new display information is stored in the service information storage 98, which requests registration to the respective display-side terminal computers 5A by showing a filename and ID of the display information.

The display manager 93 manages operation of the image display 4 and the display-side terminal computer 5A connected via network, which monitors whether the respective display-side terminal computers 5 are on service and, when the display-side terminal computer 5A is on service, under what circumstances the respective display-side terminal computers 5 are. Incidentally, when image displays provided on the bus and trains are included in the network 7, the display manager 93 obtains the location information of the image displays using GPS etc.

The service information collector 94 collects service information inputted by the information provider by operating the service terminal computer 2. The service information inputted by the information provider includes specific distribution contents as a display information, a display designation information for designating the image display 4 for the contents to be displayed, and a display operation designation information such as distribution term, frequency and time of the contents. All of the service information collected by the service information collector 94 is stored in the service information storage 98.

The service information processor 95 adds image information etc. to the contents collected by the service information collector 94 to obtain contents with highly advertising effect. Unlike the first embodiment, the service information processor 95 directly receives contents composed of text data from the information provider collected by the service information collector 94, applying background and character decoration on the text data and stores in the service information storage 98 in a predetermined file format.

The display program generator 96 generates a display program (time schedule) of the contents to be displayed on the respective image display 4 based on the above-described display operation designation information in the service information stored in the service information storage 98. The display program is generated by combining selected files to be displayed such as images according to orders to be displayed within a predetermined time, for instance, a cycle of fifteen minutes.

The service information storage 98 stores the distribution contents from the information provider collected by the service information collector 94 and files such as images processed by the service information processor 95. As shown in FIG. 12, the service information storage 98 is arranged as a database composed of a single table 981 having records for each information provider. The information stored in the table 981 includes distribution contents, a display designation information, display frequency, display term, and display operation designation information including desired display time zone (time zone when the information is desirably displayed), which has database structure different from the first embodiment where the table is arranged for every information provider. This is because the display program generator 96 automatically generates the time schedule for repeatedly displaying distribution contents by inputting display operation designation information, so that the record is not necessary to be generated for every displayed contents.

Figure 13:
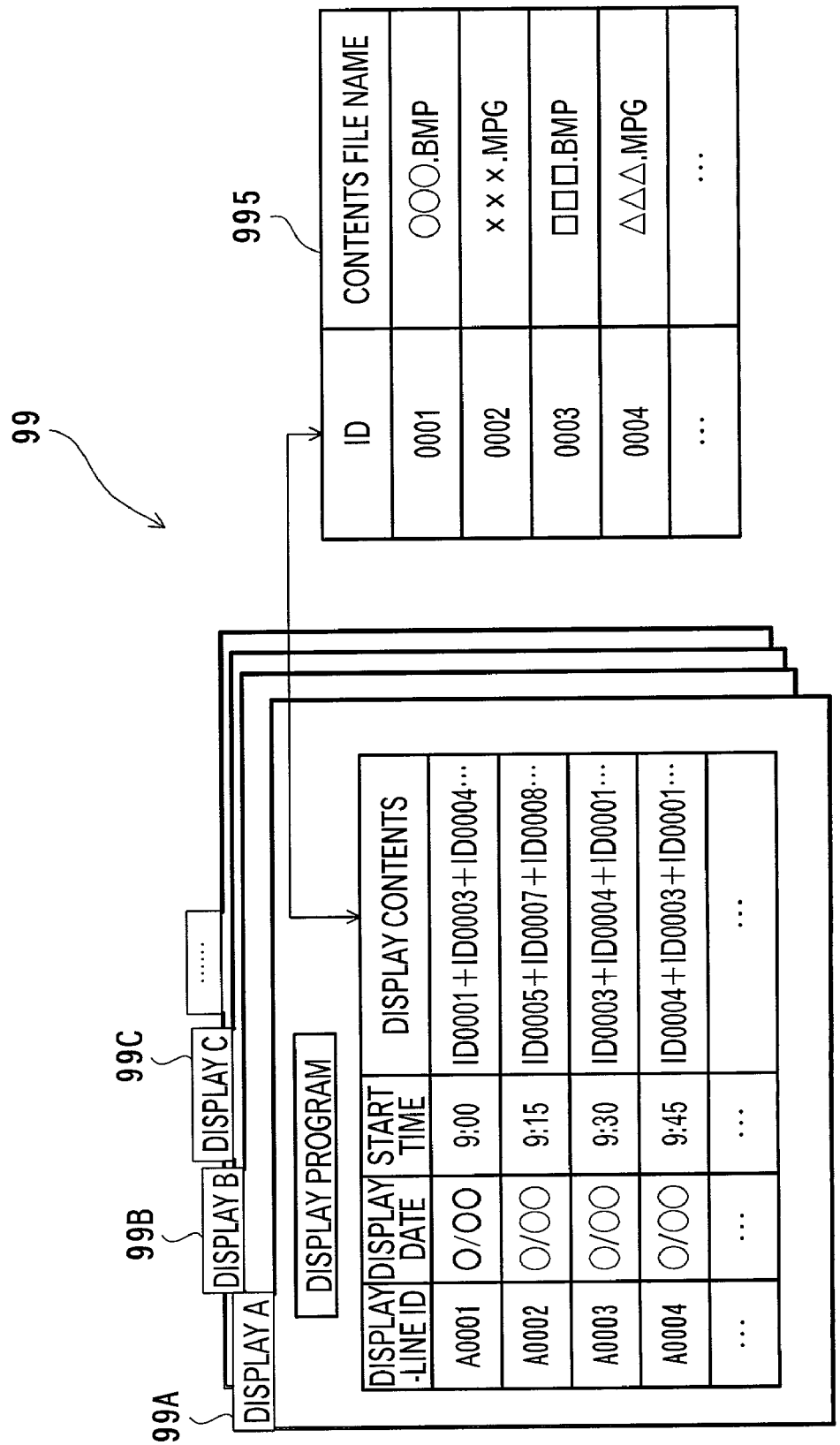
FIG. 13 is a conceptual illustration representing a display program stored in a display program storage according to the aforesaid embodiment.

The display program storage 99 stores the display program generated by the display program generator 96 for respective image displays 4. As shown in FIG. 13, the display program storage 99 is arranged as a database having time schedule tables 99A, 99B, 99C . . . set for each display 4 and file reference tables 995 linked with the time schedule tables by an ID record as a key.

The time schedule tables 99A, 99B, 99C . . . have fields of display line ID, display date, display start time and display program. The display time per one display information line (record) is fixed at a predetermined time, for instance, fifteen minutes. The line of display information line represented by ID○○○○ is stored in the display program field and the display information is displayed in the order of the display information file line. Incidentally, the total display time of the display information stored in the display program field is shorter than the display time assigned for one display information line, where, for instance, when the display time is set at fifteen minutes, the display file line is registered so that the total display time becomes thirteen to fourteen minutes.

Figure 14:
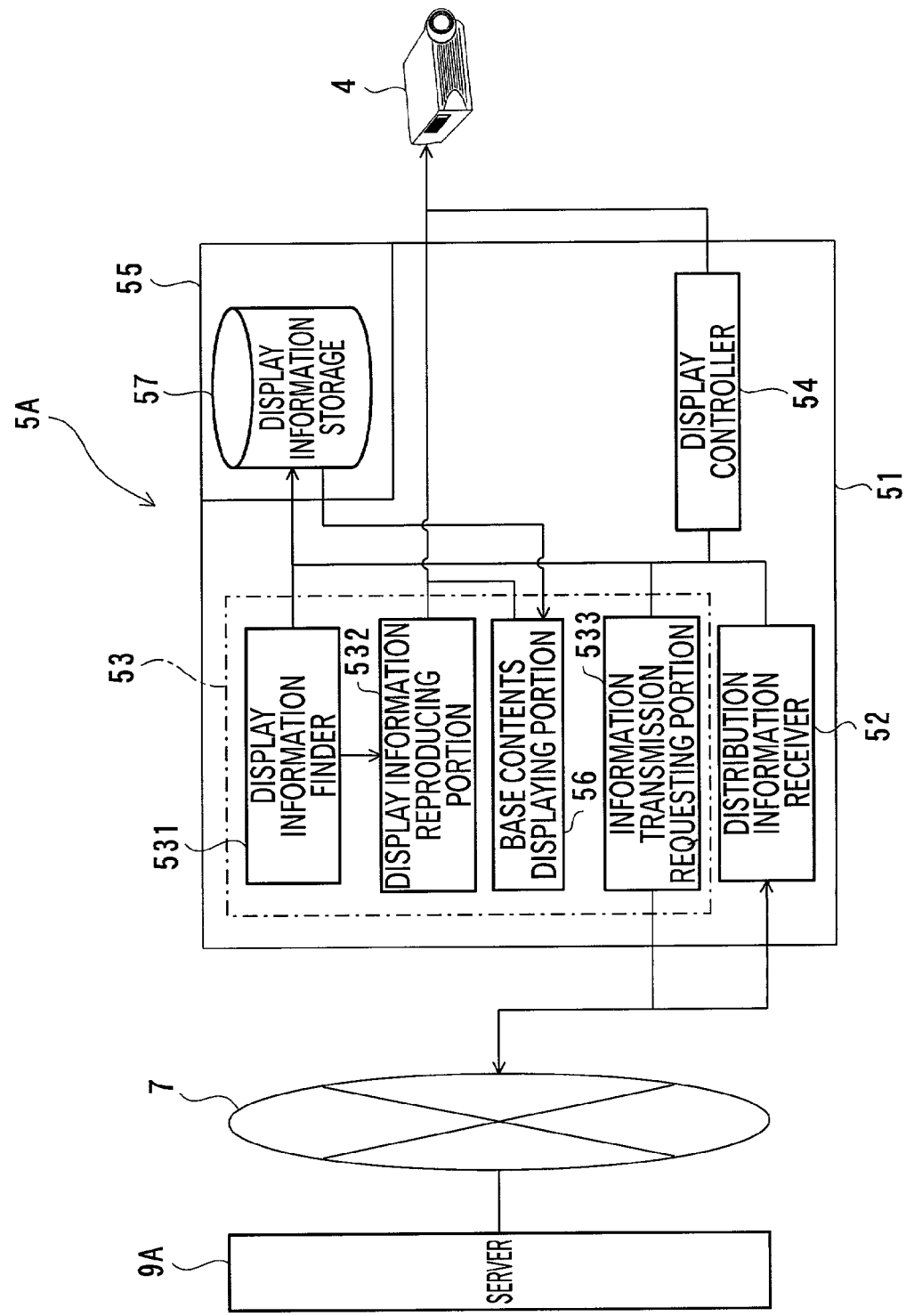
FIG. 14 is a block diagram showing a structure of a display controller according to the aforesaid embodiment.

The display-side terminal computer 5A serves as a display controller for controlling displayed image on the image display 4, which is connected with the server 9A through the network 7 as shown in FIG. 14.

The display-side terminal computer 5A has a CPU 51 and a storage 55 as in an ordinary computer, and includes a distribution information receiver 52, a display program executor 53, and a display controller 54 arranged as a program on the OS for controlling operation of the CPU 51, and a display information storage 57 arranged in the storage 55.

The distribution information receiver 52 receives distribution information inputted from the server 9A through the network 7. The distribution information includes display program, distribution contents, registration request and control information for controlling operation of the image display 4. The display program and distribution contents received by the distribution information receiver 52 are stored in the display information storage 57.

The display program executor 53 executes the display program received by the distribution information receiver 52, which includes a display information finder 531, a base contents displaying portion 56, a display information reproducing portion 532 and an information transmission requesting portion 533.

The display information finder 531 seeks a file corresponding to the ID designated in the display contents field of the time schedule table 99A . . . shown in FIG. 13 in executing reproduction of image. The display information finder 531 seeks in the display information storage 57 and, when corresponding file cannot be found, outputs to the effect to the information transmission requesting portion 533. The display information finder selects and displays the base contents when there is no display information designated at the current time zone.

The display information reproducing portion 532 extends the display information found by the image display finder 531 in a executable format to output to the image display 4 as a reproduction signal, where, for instance, image data file such as ○○.BMP is extended as an actual image signal to be outputted to the image display 4.

The base contents displaying portion 56 displays the base contents based on the designation by the display information finder 531. A predetermined moving picture and animation may be used as the base contents. Incidentally, the base contents are stored in the display information storage 57 of the respective display-side terminal computers 5A in the same manner as the display information.

The information transmission requesting portion 533 requests distribution of contents to the server 9A based on the signal from the display information finder 531. When the display information corresponding to the registration request from the server 9A is not stored in the display information storage 57, the information transmission requesting portion 533 transmits an information requesting distribution of the contents to the server 9A.

The display controller 54 controls operation of the image display 4, which switches on/off the image display 4 and, when a broadcasting satellite tuner etc. is connected to the image display 4 as well as the display-side terminal computer 5A, the display controller 54 switches image signal from the display-side terminal computer 5A and the composite signal from the broadcasting satellite tuner etc.

The display information storage 57 stores the information distributed by the server 9A, which is constructed as a database having approximately the same structure as the display program storage 99 constituting the server 9A. Incidentally, since the display information storage 57 only manages the display program thereof, the display program table for the other image display 4 is not provided, of course.

[Function of Information Distribution System]

Next, a function of the information distribution system 8A will be described below. Since the function of the information distribution system 8A can be roughly classified into collection of service information, registration and transmission request, preparation and distribution of display program, and execution of display program, which are independently conducted using multitask function of OS, the respective functions will be separately described.

(1) Collection of Service Information

Figure 15:
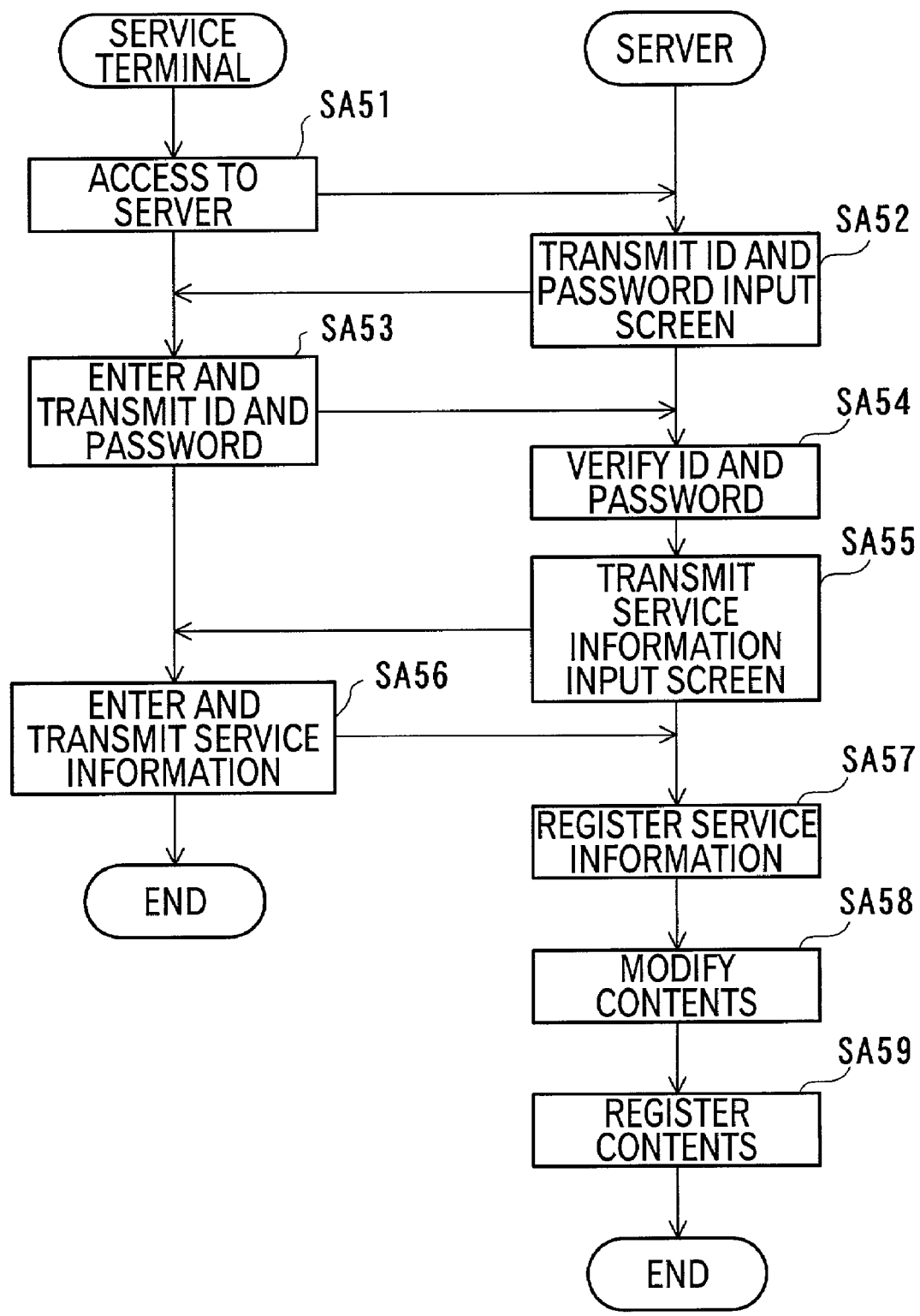
FIG. 15 is a flowchart for illustrating an operation of the information distribution system according to the aforesaid embodiment.
Figure 17:
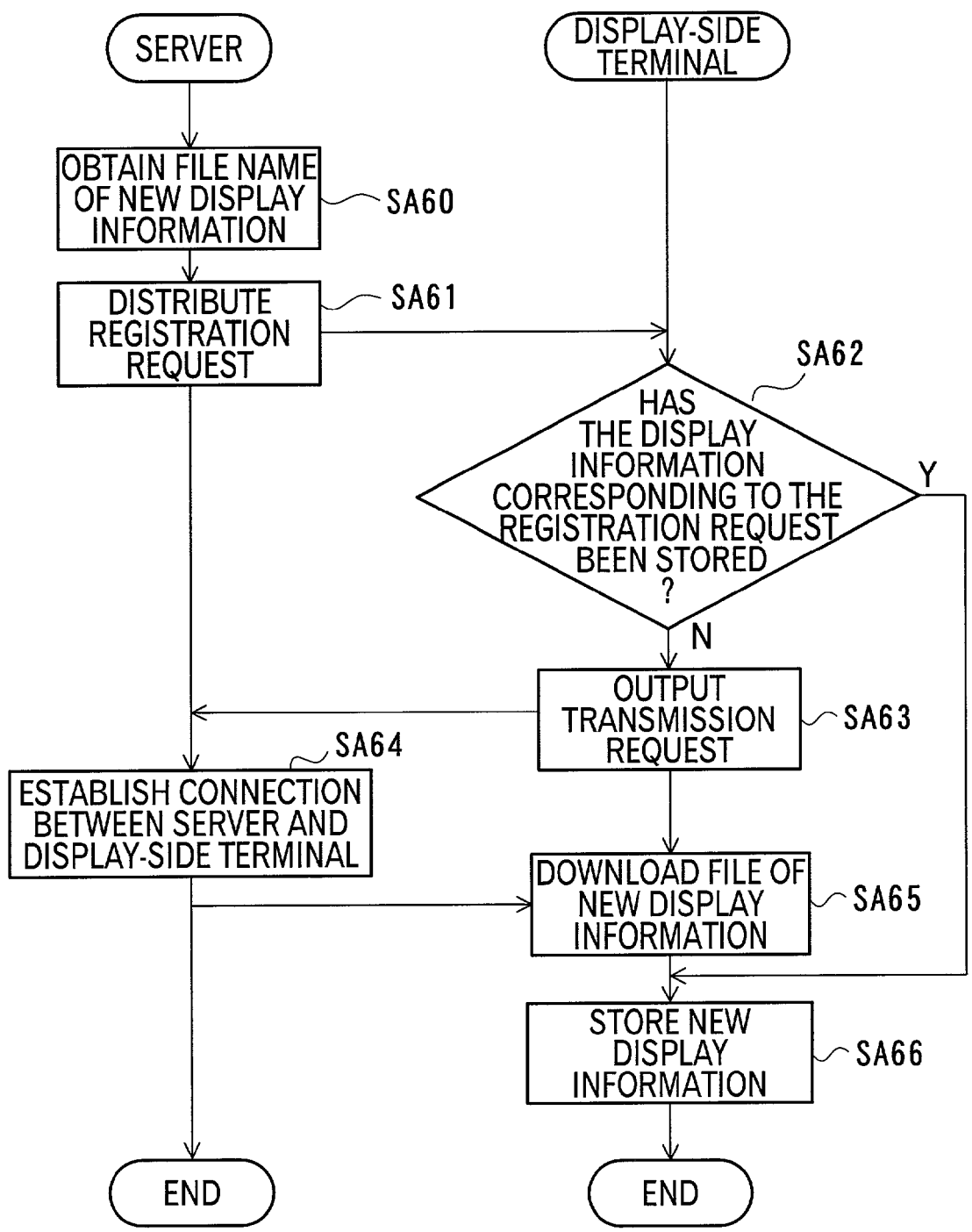
FIG. 17 is a flowchart for illustrating an operation of the information distribution system according to the aforesaid embodiment.

The service information, the registration request of the display information from the server 9A and the transmission request of the display information from the respective display-side terminal computers 5 are collected in substantially the same manner as the first embodiment according to flowchart shown in FIG. 15.

Initially, the information provider starts the web browser of service terminal computer 2 and designates a URL to access the server 9A (step SA51). The service information collector 94 transmits a screen requesting input of ID and password of the information provider in response to the access of the information provider and displays the input screen on the display of the service terminal computer 2 (step SA52).

When the information provider operates the service terminal computer 2 to enter and transmit his ID and password (step SA53), the service information collector 94 judges whether the inputted ID and password are right or not (step SA54). If the service information collector 14 judges that right ID and password are inputted, a service information input screen G50 is transmitted to the service terminal computer 2 to urge input of service information as shown in FIG. 16 (step SA55). The information provider inputs specific contents of distribution as a text and display term, frequency and desired display time zone in the respective dates during the display term of the contents. After selecting the image display 4 to which the information provider wishes to distribute the information, the register button is pressed to transmit the service information to the server 9A (step SA56).

The service information collector 94 registers and stores the received service information in the service information storage 98 as one record having a predetermined ID (step SA57: service information collecting step) and outputs the distribution contents to the service information processor 95. The service information processor 95 processes the contents composed of text data by applying character decoration and attaching background image (step SA58) to generate image file and store the image file in the service information storage 98 with a file name being applied (step SA59). Incidentally, the file name is applied corresponding to the ID, which is, for instance, "ID0001.BMP" of an image data.

(2) Registration and Transmission Request of New Display Information

When a new display information is stored in the service information storage 98, the server 9A conducts registration request distribution to the respective display-side terminal computers 5A.

Specifically, when the service information including the new display information is stored in the service information storage 98, the information is outputted to the registration request distributor 923 from the service information collector 94 on a signal. The registration request distributor 923 seeks the service information storage 98 to obtain a filename of the newly stored display information (step SA60).

The registration request distributor 923 distributes the registration request including the obtained filename to the respective display-side terminal computers 5A connected through the network 7 (step SA61: registration request distributing step).

The distributed registration request is received by the distribution information receiver 52 of the display-side terminal computer 5A and subsequently is outputted to the display information finder 531. The display information finder 531 searches whether the display information having a filename consistent with the filename included in the registration request is stored in the display information storage 57 (step SA62: display information seeking step).

When the display information finder 531 finds the corresponding file, the process is terminated judging that the display information according to the registration request has already been stored.

On the other hand, when there is no display information corresponding to the registration request, the display information finder 531 outputs a signal to the effect to the information transmission requesting portion 533 and the information transmission requesting portion 533 outputs a transmission request for the new display information to the server (step SA63: information transmission request step).

When the transmission request is received by the transmission request receiver 91, the information distributor 922 establishes the connection between the server 9A and the display-side terminal computer 5A (step SA64), the display-side terminal computer 5A downloads the display information corresponding to the transmission request registered in the service information storage 98 (step SA65).

The downloaded display information is received by the distribution information receiver 52 and, subsequently, stored by the display information storage 57.

(3) Preparation and Distribution of Display Program

Figure 18:
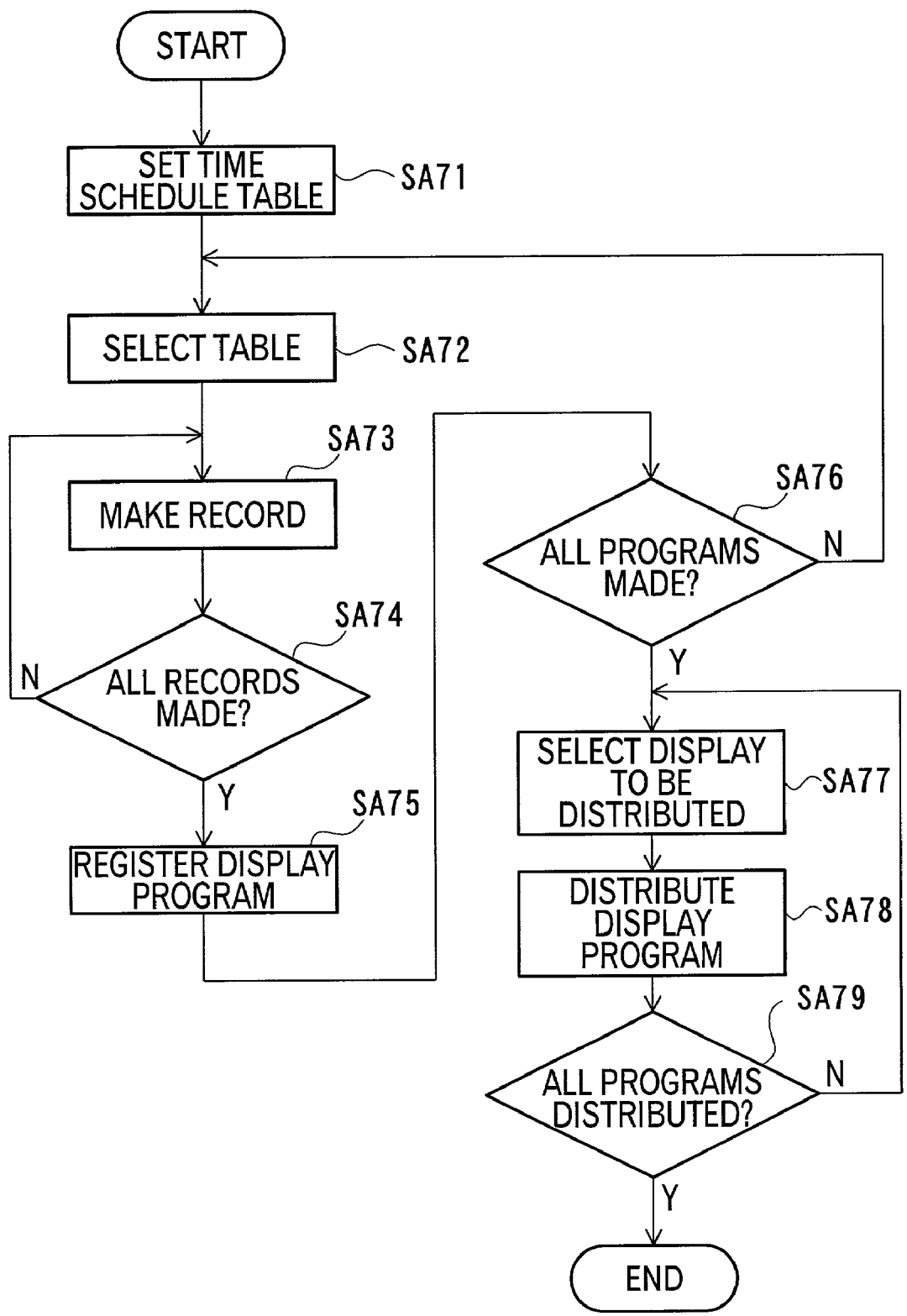
FIG. 18 is a flowchart for illustrating an operation of the information distribution system according to the aforesaid embodiment.

The display program is prepared mainly by the server 9A according to flowchart shown in FIG. 18.

After a predetermined number of service information is stored by collecting the service information as described above, the display program generator 96 starts to produce display program for every image display 4.

Initially, the display program generator 96 sets a plurality of tables corresponding to the respective image displays 4 (step SA71).

Then, the display program generator 96 selects a table corresponding to the image display 4 for generating the display program (step SA72). Further, the display program generator 96 selects ID of contents displayed for a predetermined time, for instance, fifteen minutes for one record based on the desired display time zone of the respective service information stored in the service information storage 98 to generate column of ID corresponding to display order and the column of ID is written on a display contents field of the time schedule table 99A to generate a record (step SA73: display program preparation step).

The record is repeatedly generated on the time schedule table 99A until all the records corresponding to a predetermined term are generated (step SA74). After completing to generate all of the record, the completed time schedule table 99A is registered to the display program storage 99 (step SA75).

Similarly, the record is repeatedly generated on the other time schedule tables 99B, 99C . . . (step SA76). After completion of the display programs for all display-side terminal computers 5A managed by the server 9A, preparation of the display program is terminated.

Subsequently, the display program distributor 921 designates the image display 4 for distributing the display program (step SA77) and calls the display program corresponding to the designated display-side terminal computer 5A from the display program storage 99 to distribute the display program (step SA78: display program distribution step).

The display program distributor 921 repeats the above operation until the distribution is completed for all display-side terminal computers 5A managed by the server 9A (step SA79). After completion of distributing the display program to all display-side terminal computers 5A, the distribution of display program is completed.

(4) Execution of Display Program

Figure 19:
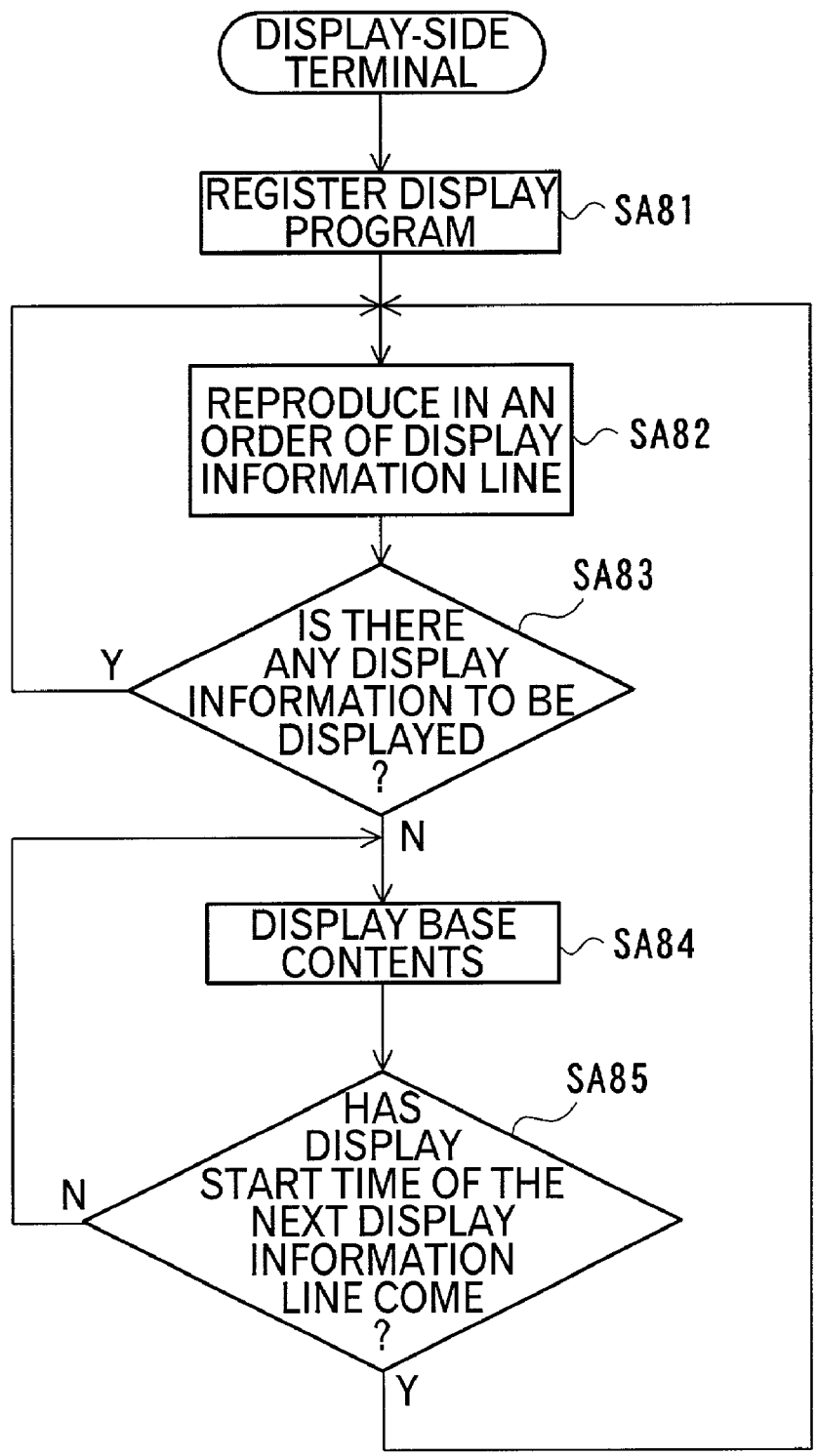
FIG. 19 is a flowchart for illustrating an operation of the information distribution system according to the aforesaid embodiment.

The display program is executed by the display-side terminal computer 5A for the display program to be distributed, specifically, according to flowchart shown in FIG. 19.

The distribution information receiver 52 of the display-side terminal computers 5A receives the display program distributed by the server 9A in the step SA78 and stores in the display information storage 57 (step SA81: display program storing step).

When a predetermined time has come, the display program executor 53 reproduces the display information for each display information of one record and displays the image on the image display 4 based on the time of start time field of the display program stored in the display information storage 57 (step SA82: display program executing step).

In executing the display program, the display information finder 531 let the display information reproducing portion 532 sequentially display the display information while there still is a display information to be displayed, however, when there is no display information to be displayed, the display information finder 531 switches to displaying the base contents (step SA83). Specifically, the base contents display 56 is started to display the base contents stored in the display information storage 57 on the image display 4 (step SA84: base contents displaying step).

When the time has reached to the start time of the next display information line of the display program while displaying the base contents (step SA85), the display information reproducing portion 532 forcibly switches the image to display the display information according to the display program on the image display 4 irrespective of the display condition of the base contents image, and the same process is repeated until the display program is terminated.

[Effect of the Embodiment]

According to the above-described second embodiment, following effects can be obtained.

Since the display-side terminal computer 5A of the information distribution system 8A has the display program generator 96 and the display program executor 53, the display program generator 96 generates the display program according to date, time and frequency designated by the information provider, based on which the display program executor 53 displays the service information provided by the information provider such as advertisement onto the image display 4. Accordingly, the information relating to services etc. can be provided to consumers in a timely and convenient manner, thus enabling the information provider to conduct more efficient advertisement.

Further, since the display program executor 53 is provided to the display-side terminal computer 5A for controlling the image display 4, it is only required for the server 9A to distribute the display program and the display information to the respective display-side terminal computers 5A in order to automatically display the display information on the respective image displays 4 according to the display program thereafter, so that the burden on the server 9A can be reduced, thereby displaying service information in a more efficient manner.

Since the display-side terminal computer 5A has the display information storage 57, the information distributed by the server 9A can be stored in the display information storage 57, so that repetition of information display based on the same display program and display information can be automatically processed within the display-side terminal computer 5A after once distributing information from the server 9A, thus reducing communication frequency with the server 9A of the network 7 for conducting efficient network communication.

Since the display program executor 53 includes the display information finder 531 and the information transmission requesting portion 533, the display program executor 53 requests information transmission to the server 9A only when there is not a desired display information in the display information storage 57, thus minimizing communication between the display-side terminal computer 5A and the server 9A, so that the network communication can be made further efficient.

Since the base contents displaying portion 56 is provided, the interval between display information lines of the display program can be filled with the base contents, so that some information can be constantly displayed on the image display 4.

Since the information distribution system 8A is implemented according to a series of steps including the service information collecting step SA57, the display program preparation step SA73, the display program distribution step SA78, the display program storing step SA81 and the display program executing step SA82, the service information from the information provider can be provided to the consumers in a timely and convenient manner and the display program can be prepared for efficiently displaying the service information on the respective image displays 4.

Since the program for executing the respective steps can be implemented with a client-server system using general computers, the applicability of the present invention can be greatly improved.

[3] Third Embodiment

Next, third embodiment of the present invention will be described below.

[Arrangement of Information Distribution System]

Figure 20:
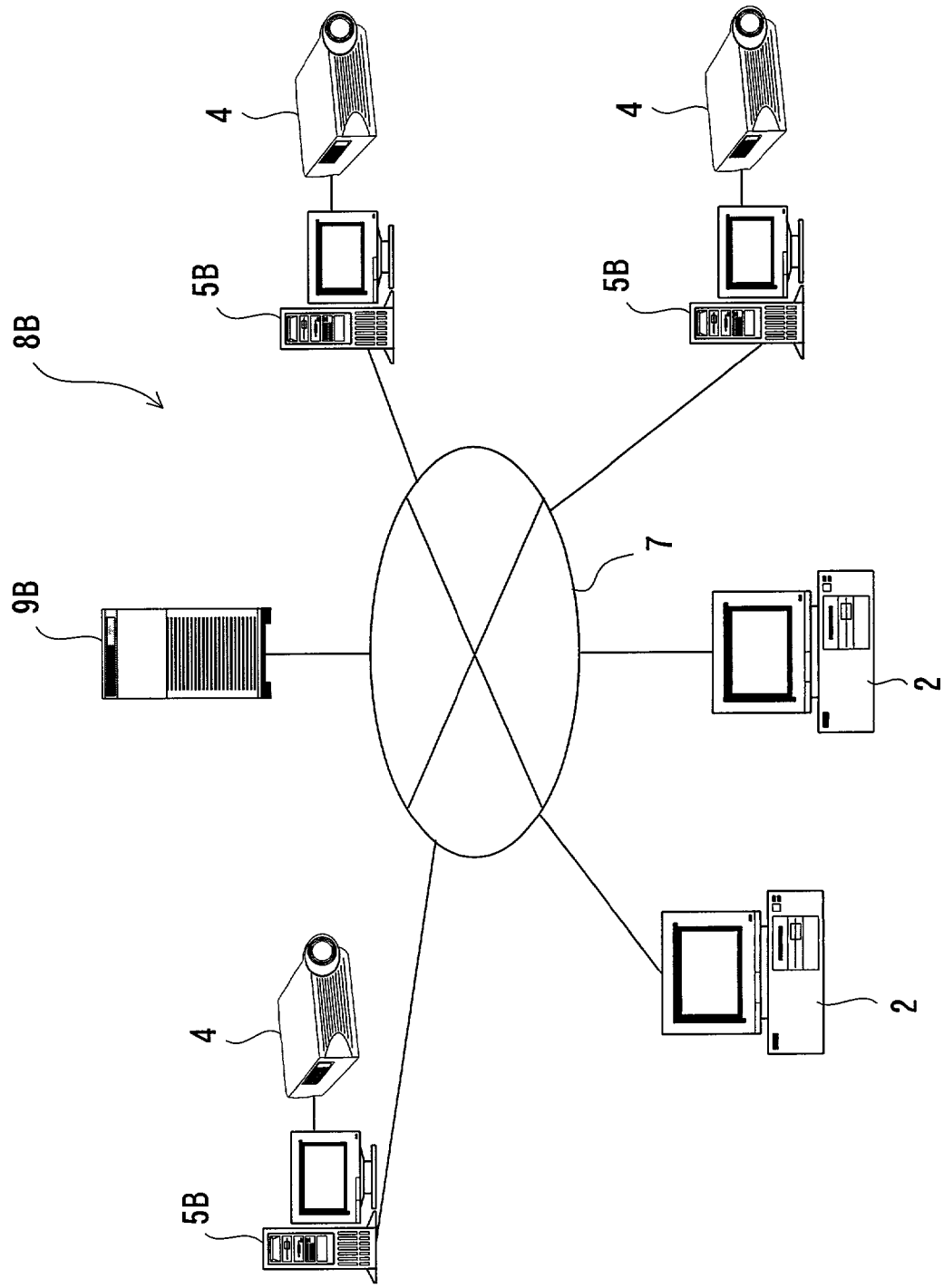
FIG. 20 is a schematic view showing a network setup of the information distribution system of a third embodiment of the present invention.

FIG. 20 shows an information distribution system 8B according to the third embodiment. The information distribution system 8B includes a service terminal computer 2, an image display 4, a display-side terminal computer 5B as a display controller, a network 7 and server 9A as in the same manner as the network system of the second embodiment.

Figure 21:
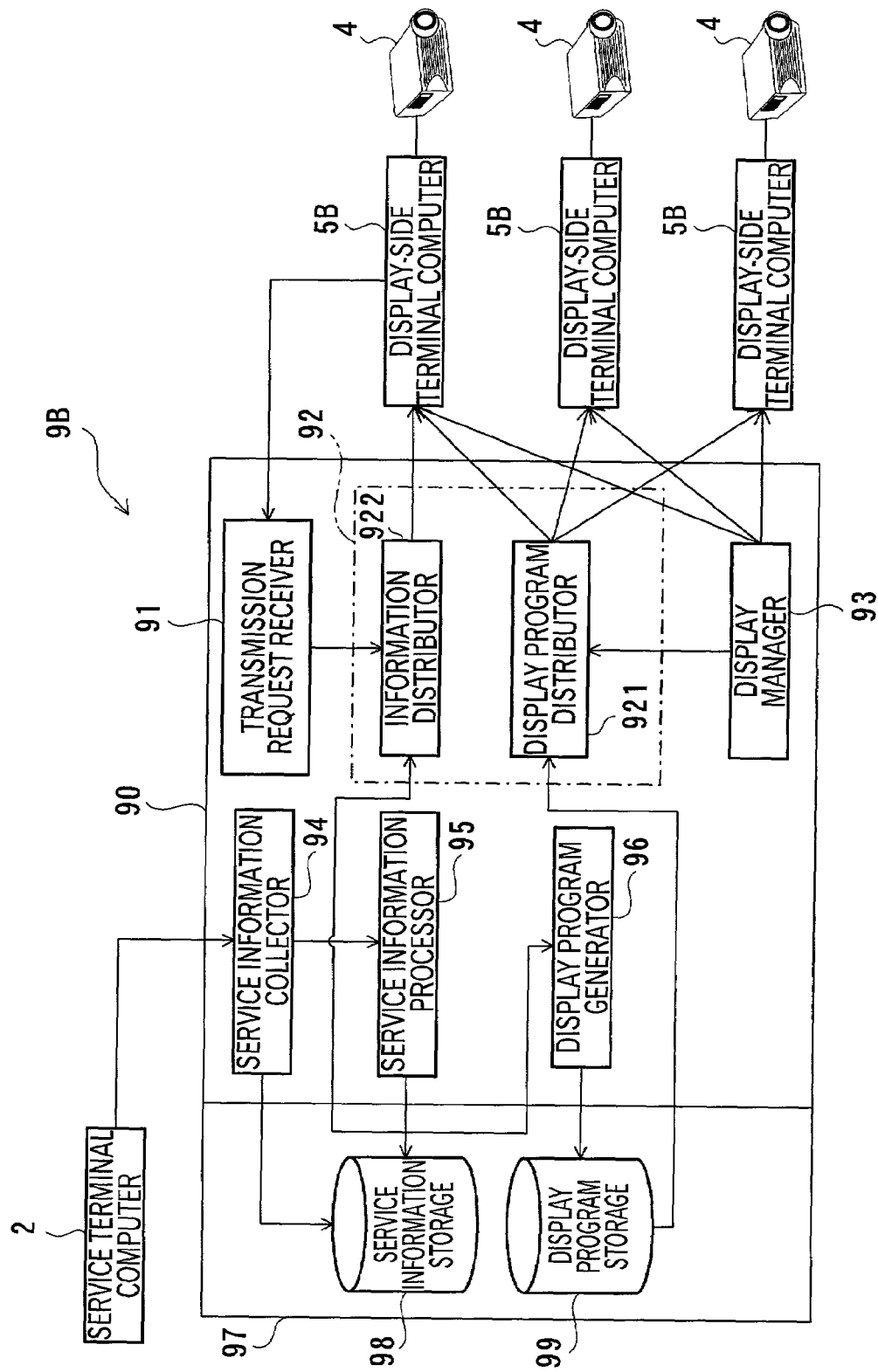
FIG. 21 is a block diagram showing an arrangement of a server composing the information distribution system according to the aforesaid embodiment.

As shown in FIG. 21, the server 9B has a CPU 90 and a storage 97, and further includes a transmission request receiver 91, a distribution information output 92, a display manager 93, a service information collector 94, a service information processor 95 and a display program generator 96 arranged as a program on the OS having multitask function for controlling the operation of the CPU 91, and a service information storage 98 and a display program storage 99 set in a storage 97.

The transmission request receiver 91 receives contents distribution request from the below-described display-side terminal computer 5B.

The distribution information output 92 has a display program distributor 921 and an information distributor 922. The display program distributor 921 transmits display program, i.e. a time schedule, of the respective image displays 4 to the respective display-side terminal computers 5B connected through the network 7.

On the other hand, the information distributor 922 distributes specific contents to the image display 4, which distributes the contents in response to the request from the display-side terminal computer 5B received by the transmission request receiver 91.

The display manager 93 manages operation of the image display 4 and the display-side terminal computer 5B connected via network, which monitors whether the respective display-side terminal computers 5 are on service and, when the display-side terminal computers 5B are on service, under what circumstances the respective display-side terminal computers 5 are. Incidentally, when image displays provided on the bus and trains are included in the network 7, the display manager 93 obtains the location information of the image displays using GPS etc.

The service information collector 94 collects service information inputted by the information provider by operating the service terminal computer 2. The service information inputted by the information provider includes specific distribution contents as a display information, a display designation information for designating the image display 4 for the contents to be displayed, and a display operation designation information such as distribution term, frequency and time of the contents. All of the service information collected by the service information collector 94 is stored in the service information storage 98.

The service information processor 95 adds image information etc. to the contents collected by the service information collector 94 to obtain contents with highly advertising effect. Unlike the first embodiment, the service information processor 95 directly receives contents composed of text data from the information provider collected by the service information collector 94, applying background and character decoration on the text data and stores in the service information storage 98 in a predetermined file format.

The display program generator 96 generates a display program (time schedule) of the contents to be displayed on the respective image display 4 based on the above-described display operation designation information in the service information stored in the service information storage 98. The display program is generated by combining selected files to be displayed such as images according to orders to be displayed within a predetermined time, for instance, a cycle of fifteen minutes.

The service information storage 98 stores the distribution contents from the information provider collected by the service information collector 94 and files such as images processed by the service information processor 95. As shown in FIG. 22, the service information storage 98 is arranged as a database composed of a single table 981 having records for each information provider. The information stored in the table 981 includes distribution contents, a display designation information, display frequency, display term, and display operation designation information including desired display time zone (time zone when the information is desirably displayed), which has database structure different from the first embodiment where the table is arranged for every information provider. This is because the display program generator 96 automatically generates the time schedule for repeatedly displaying distribution contents by inputting the display operation designation information, so that the record is not necessary to be generated for every displayed contents.

Figure 23:
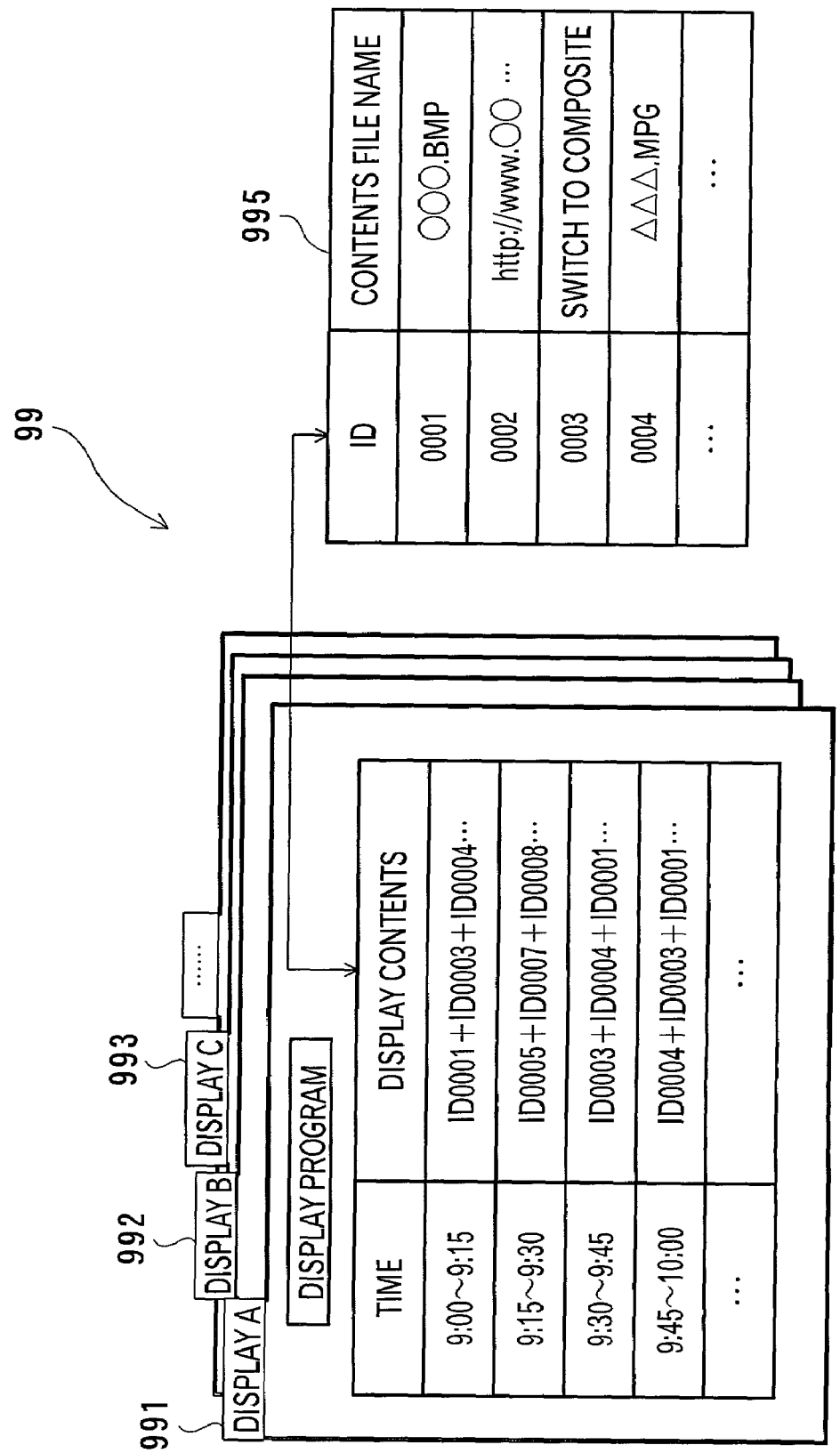
FIG. 23 is a conceptual illustration representing a display program stored in a display program storage according to the aforesaid embodiment.

The display program storage 99 stores the display program generated by the display program generator 96 for the respective image displays 4. As shown in FIG. 23, the display program storage 99 is arranged as a database having time schedule tables 991, 992, 993 . . . set for each display 4 and file reference tables 995 linked with the time schedule tables by ID record as a key.

The time schedule tables 991, 992, 993 . . . store one cycle of displaying contents generated by the display program generator 96 as one record storing contents to be displayed during the cycle as a series of ID number. On the other hand, the file reference table 995 is constructed as one table correspondingly storing respective IDs and file names of contents.

Figure 24:
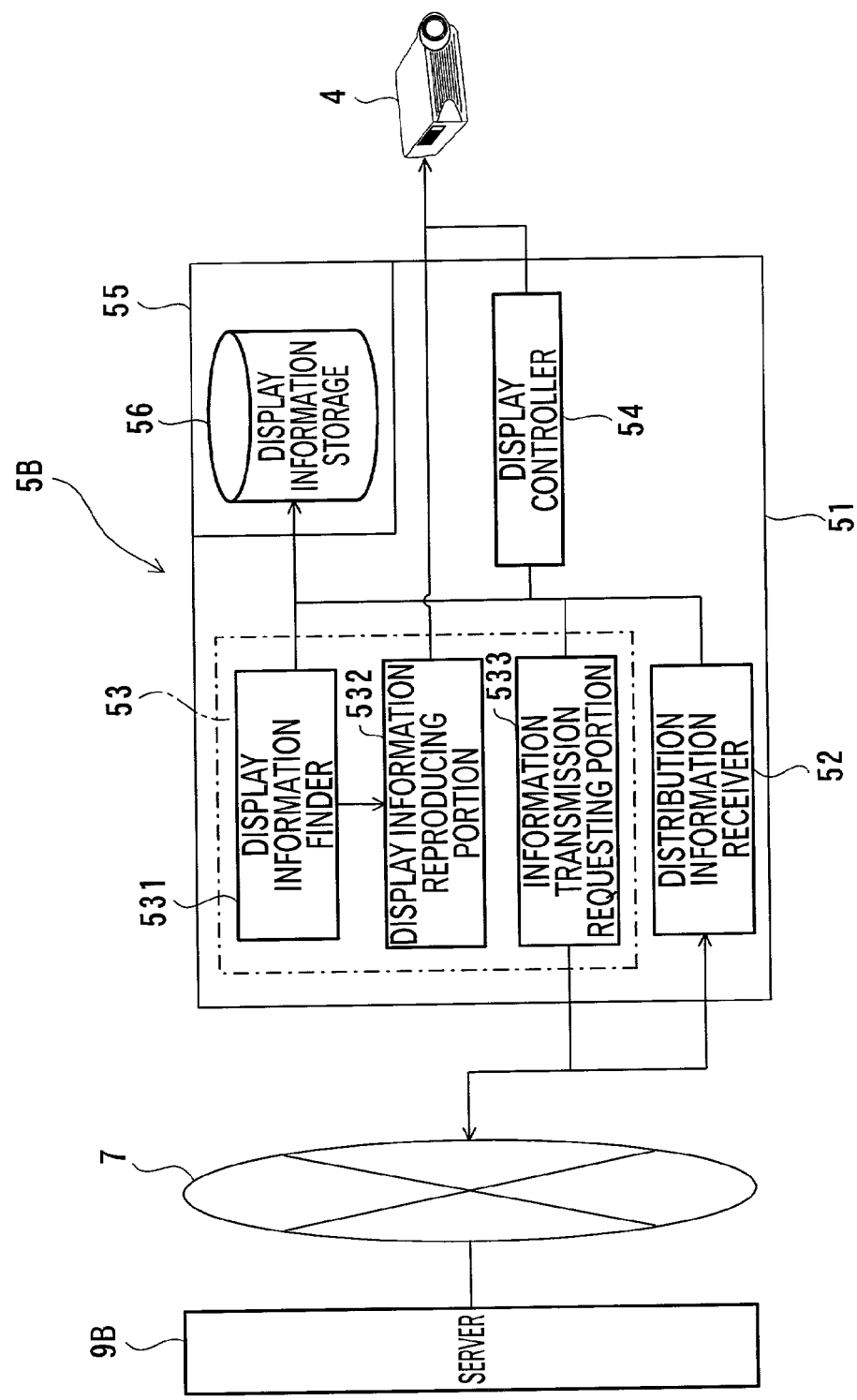
FIG. 24 is a block diagram showing a structure of a display controller according to the aforesaid embodiment.

The display-side terminal computer 5B serves as a display controller for controlling displayed image on the image display 4, which is connected with the server 9B through the network 7 as shown in FIG. 24.

The display-side terminal computer 5B has a CPU 51 and a storage 55 as in the ordinary computer, and includes a distribution information receiver 52, a display program executor 53, and a display controller 54 arranged as a program on the OS for controlling operation of the CPU 51, and a display information storage 56 arranged in the storage 55.

The distribution information receiver 52 receives distribution information inputted from the server 9B through the network 7. The distribution information includes display program, distribution contents, registration request and control information for controlling the operation of the image display 4. The display program and distribution contents received by the distribution information receiver 52 are stored in the display information storage 56.

The display program executor 53 executes the display program received by the distribution information receiver 52, which includes a display information finder 531, a display information reproducing portion 532 and an information transmission requesting portion 533.

The display information finder 531 seeks a file corresponding to the ID designated in the display contents field of the time schedule table 991 . . . shown in FIG. 23 in executing reproduction of image based on the distributed display rogram. The display information finder 531 seeks in the display information storage 56 and, when corresponding file cannot be found, outputs to the effect to the information transmission requesting portion 533.

The display information reproducing portion 532 extends the display information found by the image display finder 531 in a executable format to output to the image display 4 as a reproduction signal, where, for instance, image data file such as ○○.BMP is extended as an actual image signal to be outputted to the image display 4.

The information transmission requesting portion 533 requests distribution of contents to the server 9B based on the signal from the display information finder 531. When a file corresponding to ID indicated in the display program does not exist in the display information storage 56, the information transmission requesting portion 533 transmits an information requesting distribution of the contents to the server 9B.

The display controller 54 controls operation of the image display 4, which switches on/off the image display 4 and, when a broadcasting satellite tuner etc. is connected to the image display 4 as well as the display-side terminal computer 5B, the display controller 54 switches image signal from the display-side terminal computer 5B and the composite signal from the broadcasting satellite tuner etc.

The display information storage 56 stores the information distributed by the server 9B, which is constructed as a database having approximately the same structure as the display program storage 99 constituting the server 9B. Incidentally, since the display information storage 56 only manages the display program thereof, the display program table for the other image display 4 is not provided, of course.

[Function of Information Distribution System]

Next, a function of the information distribution system 8B will be described below. Since the function of the information distribution system 8B of the present embodiment can be roughly classified into collection of service information, preparation and distribution of the display program, and execution of the display program, which are independently conducted using multitask function of OS, the respective functions will be separately described.

(1) Collection of Service Information

Figure 25:
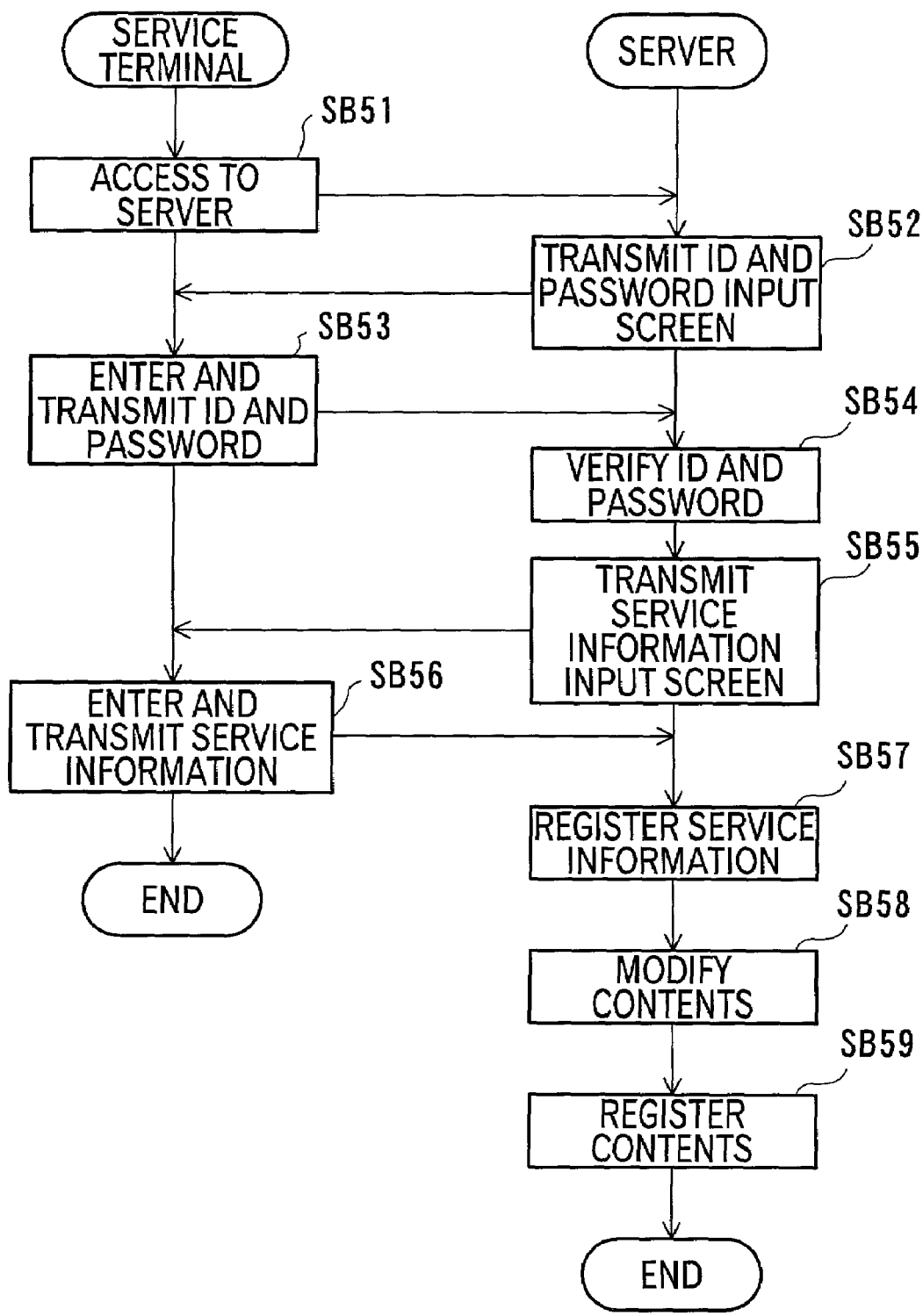
FIG. 25 is a flowchart for illustrating an operation of the information distribution system according to the aforesaid embodiment.

The service information is collected in substantially the same manner as the first embodiment according to flowchart shown in FIG. 25.

Initially, the information provider starts the web browser of service terminal computer 2 and designates a URL to access the server 9B (step SB51). The service information collector 94 transmits a screen requesting input of ID and password of the information provider in response to the access of the information provider and displays the input screen on the display of the service terminal computer 2 (step SB52).

When the information provider operates the service terminal computer 2 to enter and transmit his ID and password (step SB53), the service information collector 94 judges whether the inputted ID and password are right or not (step SB54). If the service information collector 14 judges that right ID and password are inputted, a service information input screen G50 is transmitted to the service terminal computer 2 to urge input of service information as shown in FIG. 26 (step SB55). The information provider inputs specific contents of distribution as a text on the service information input screen G50 and inputs display term, frequency and desired display time zone in the respective dates during the display term. After selecting the image display 4 to which the information provider wishes to distribute the information, a register button is pressed to transmit the service information to the server 9B (step SB56).

The service information collector 94 registers and stores the received service information in the service information storage 98 as one record having a predetermined ID (step SB57: service information collecting step) and outputs the distribution contents to the service information processor 95. The service information processor 95 processes the contents composed of text data by applying character decoration and attaching background image (step SB58) to generate image file and stores the image file in the service information storage 98 with a file name being applied (step SB59). Incidentally, the file name is applied corresponding to the ID, which is, for instance, "ID0001.BMP" of an image data.

(2) Preparation and Distribution of Display Program

Figure 27:
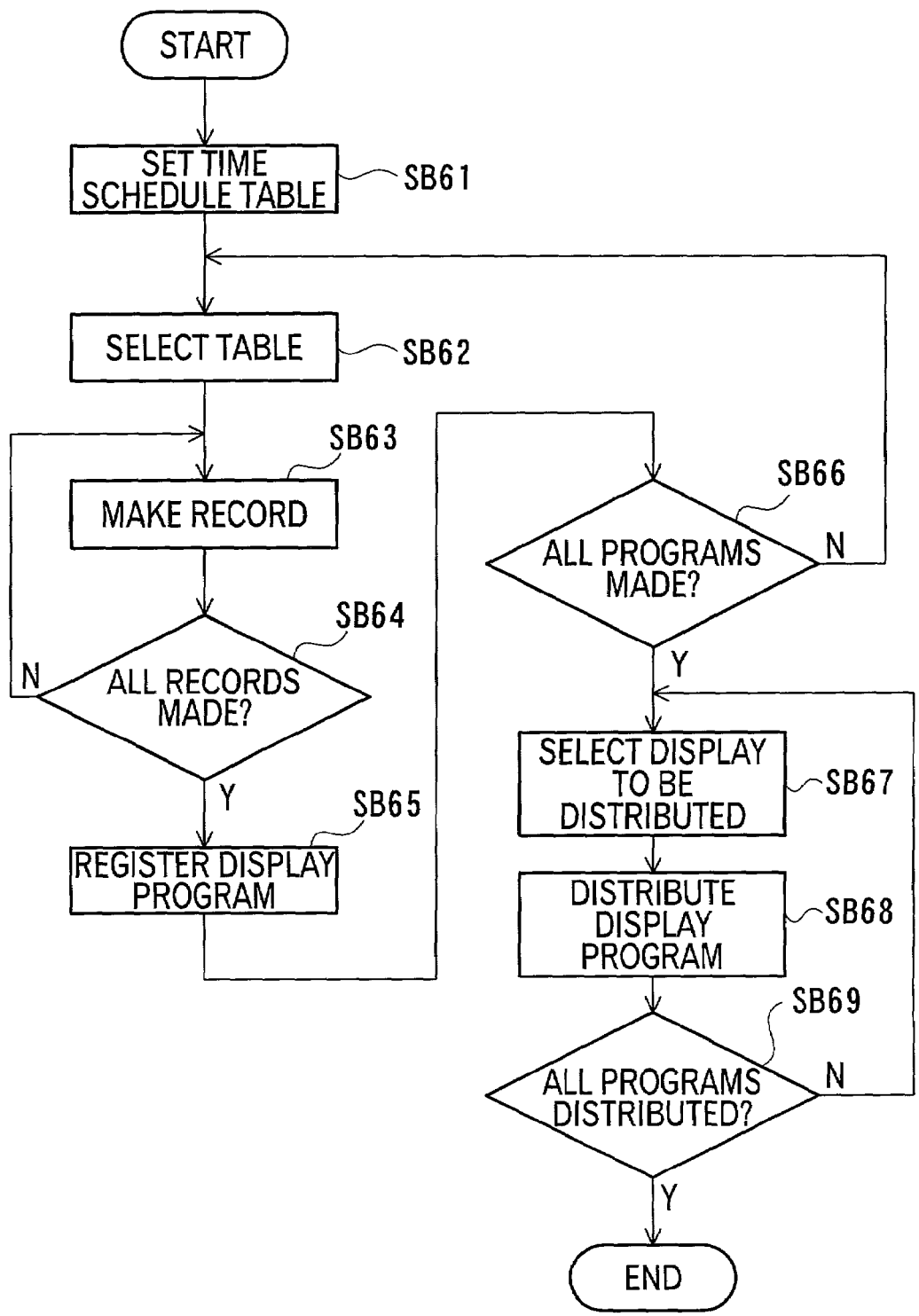
FIG. 27 is a flowchart for illustrating an operation of the information distribution system according to the aforesaid embodiment.

The display program is prepared mainly by the server 9B according to flowchart shown in FIG. 27.

After a predetermined number of service information is stored by collecting the service information as described above, the display program generator 96 starts to produce display program for every image display 4.

Initially, the display program generator 96 sets a plurality of table corresponding to the respective image displays 4 (step SB61).

Then, the display program generator 96 selects a table corresponding to the image display 4 for generating the display program (step SB62). Further, the display program generator 96 selects ID of contents displayed for a predetermined time, for instance, fifteen minutes for one record based on the desired display time zone of the respective service information stored in the service information storage 98 to generate column of ID corresponding to display order and the column of ID is written on a display contents field of the time schedule table 991 to generate a record (step SB63: display program preparation step).

The record is repeatedly generated on the time schedule table 991 until all the records corresponding to a predetermined term are generated (step SB64). After completing to generate all of the record, the completed time schedule table 991 is registered to the display program storage 99 (step SB65).

Similarly, the record is repeatedly generated on the other time schedule tables 992, 993 . . . (step SB66). After completion of the display programs for all display-side terminal computers 5B managed by the server 9B, preparation of the display program is terminated.

Subsequently, the display program distributor 921 designates the image display 4 for distributing the display program (step SB67) and calls the display program corresponding to the designated display-side terminal computer 5B from the display program storage 99 to distribute the display program (step SB68: display program distribution step).

The display program distributor 921 repeats the above operation until the distribution is completed for all display-side terminal computers 5B managed by the server 9B (step SB69). After completion of distributing the display program to all display-side terminal computers 5B, the distribution of display program is completed.

(3) Execution of Display Program

Figure 28:
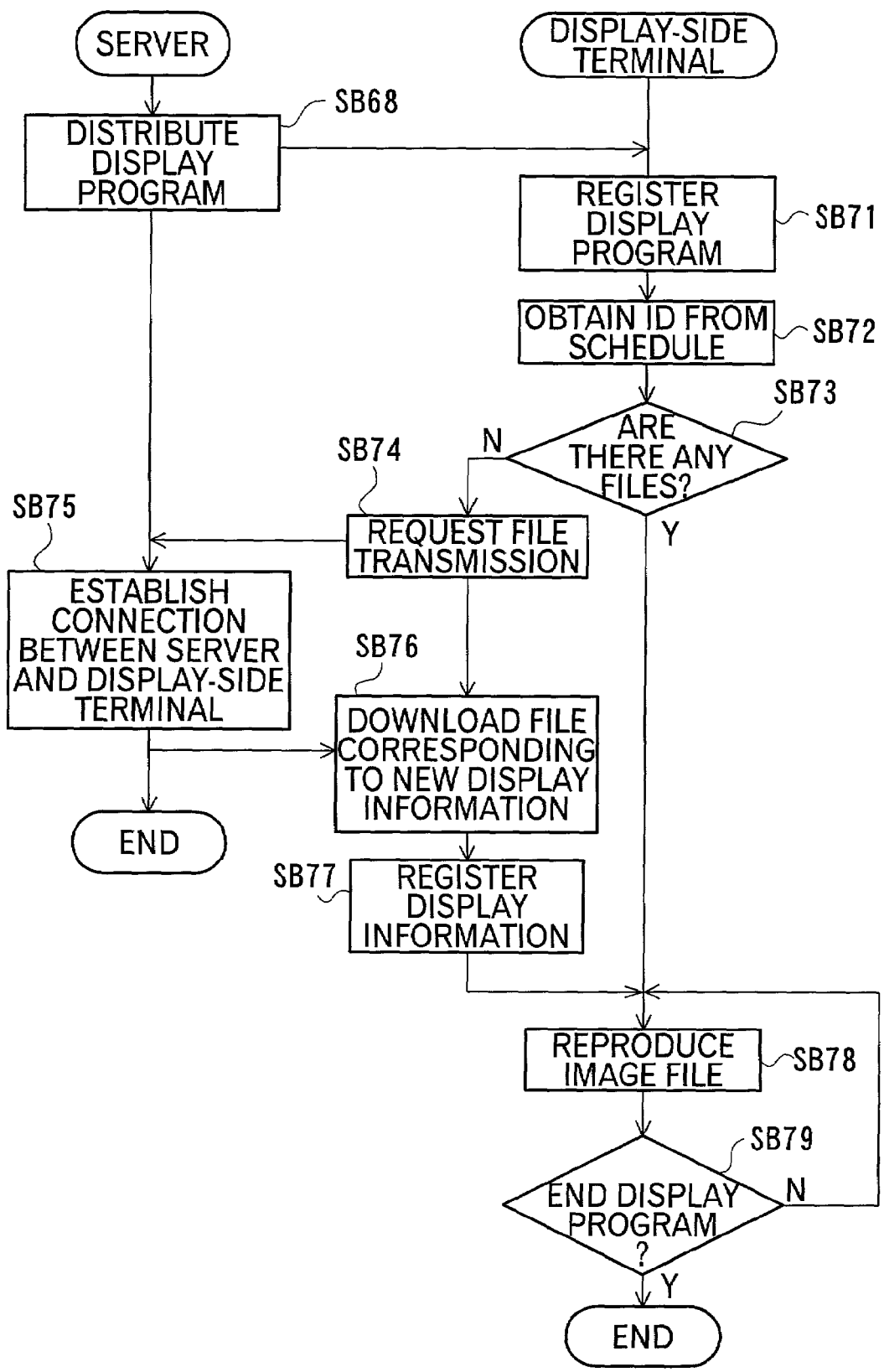
FIG. 28 is a flowchart for illustrating an operation of the information distribution system according to the aforesaid embodiment.

The display program is executed by the display-side terminal computer 5B for the display program to be distributed, specifically, according to flowchart shown in FIG. 28.

The distribution information receiver 52 of the display-side terminal computers 5 receives the display program distributed by the server 9B in the step SB68 and stores in the display information storage 56 (step SB71: display program storing step).

The display information finder 531 of the display program executer 53 obtains ID of all the display information contained in the display program prior to executing the display program (step SB72) to find whether the corresponding display information is stored in the display information storage 56 or not (step SB73: display information seeking step).

When there is a non-stored display information as a result of the search, the display information finder 531 notifies the information including the ID of the display information to the information transmission requesting portion 533. The information transmission requesting portion 533 outputs a transmission request to the server 9B (step SB74: information transmission requesting step).

When the transmission request is received by the transmission request receiver 91 of the server 9B, the information distributor 922 establishes the connection between the display-side terminal computer 5B having conducted the transmission request and the server 9B (step S75) and the display-side terminal computer 5B downloads the image file corresponding to the display information according to the transmission request (step SB76) and stores in the display information storage 56 (step SB77).

After all the display information of the display program is downloaded, the display information reproducing portion 532 reproduces the downloaded image files to generate an image information to display the image on the image display 4 (step SB78).

The same process is repeated for each record to conduct reproduction of the image file, which is repeated in the same manner until the display program is terminated (step SB79).

[Effect of Embodiment]

Following effects can be obtained according to the above-described third embodiment.

The display-side terminal computer 5B of the information distribution system 8B has the display program generator 96 and the display program executer 53, the program generator 96 generating the display program in accordance with the date and frequency designated by the information provider, based on which the display program executer 53 displays the service information such as advertisement provided by the information provider on the image display 4. Accordingly, the information on the service etc. can be provided to those in demand in a timely and convenient manner and the information provider can conduct more efficient advertisement.

Since the display program executer 53 is installed in the display-side terminal computer 5B for controlling the image display 4, the display information can be automatically displayed on the respective image displays 4 in accordance with the display program only by distributing the display program and the display information by server 9B, so that the burden on the server 9B can be reduced and the service information can be displayed in a more efficient manner.

Since the display-side terminal computer 5B has the display information storage 56, the information distributed by the server 9B can be stored in the display information storage 56, so that the repeated display of the information based on the same display program and the same display information can be automatically conducted in the terminal-side computer 5B by once distributing the information from the server 9B, thereby reducing communication frequency with the server 9B on the network 7 and enhancing the efficiency of the network communication.

Since the display program executor 53 has the display information finder 531 and the information transmission requesting portion 533, the display program executer 53 requests the information transmission to the server 9B only when there is not desired display information in the display information storage 56, thereby minimizing the communication between the display-side terminal computer 5B and the server 9B so that the efficiency of the network communication can be further enhanced.

Further, since the information distribution system 8B is operated according to the series of steps including the service information collecting step S57, the display program generating step S63, the display program distribution step S68, the display program storing step S71 and the display program executing step, the service information by the information provider can be provided to those in demand in a timely and convenient manner, and the service information can be efficiently displayed on the respective image displays 4 by generating the display program.

According to the program for executing the respective steps, the present invention can be implemented by a client/server system using a general-type computer, the availability of the present invention can be greatly enhanced.

[3] Modifications of the Embodiment

Incidentally, the scope of the present invention is not restricted to the above-described respective embodiments, but includes following modifications.

Though the distribution information output 12, the display location information collector 13, the service information collector 14 and the service information processor 15 of the first embodiment are arranged in the single server 10, the information distribution system may be arranged as a system including a plurality of servers.

Though the information distribution system 1 is arranged as a network 7 using lines such as the Internet in the first embodiment, the present invention may be arranged as a predetermined LAN (Local Area Network).

Though one of the image displays 4 and 6 is selected from a menu when the information provider selects the displays in the first embodiment, the arrangement is not limited. Specifically, a map may be displayed on the input screen and the location of the image displays may be displayed on the map, so that the information provider can optionally select a plurality of the displays from the image displays shown on the map.

Though the image display 4 composed of a projector and the image display 6 composed of a liquid crystal display are used as the displays in the first embodiment, a display using LED or PDP may be used as the image display.

The present invention is not only arranged as a system including the service terminal computer 2, the mobile terminal 3, the image displays 4 and 6 and the server 10 as shown in the first embodiment, but may also be arranged as a method for operating the devices. Further, the present invention may also be arranged as a program for implementing the method and a computer-readable recording medium storing the program.

Though the service information composed of character data is inputted in the input screen G1 in the first embodiment, image files etc. may be attached as required. Accordingly, since the image file photographing stores or a map can be attached as the image file, the use of the system can be further facilitated for the information provider.

Though the display program executor 53 is arranged as a program extended on the CPU 51 of the display-side terminal computer 5 in the second embodiment, the arrangement is not limited. Alternatively, the display program executor may be arranged as a program extended on the CPU 91 of the server 9A.

Though only the display program is initially distributed from the server 9A to the display-side terminal computer 5A in the second embodiment, the arrangement is not limited. Alternatively, the image file corresponding to the ID in the distributed display program may be distributed simultaneously with distributing the display program in the first distribution.

Though the image file is obtained mainly by the display-side terminal computer 5 when the display-side terminal computer 5 requests information transmission to obtain the image file in the second embodiment, the present invention is not limited to such an arrangement. Specifically, the image file may be distributed to the respective display-side terminal computers 5A mainly by the server 9A.

Though the display program generates the display information line of one record according to a unit of a predetermined time (fifteen minutes) as shown in FIG. 13 in the second embodiment, the arrangement is not restricted. The time of the display information line of one record may be arranged in any manner and, in preparing the display information line by the display program, a predetermined reserve time may be added to the total time of the display information line of one record as the start time of the next display information line, so that the start time of the respective records can be set in a mobile manner.

Specific arrangement in implementing the present invention may be altered as long as an object of the present invention can be achieved.

INDUSTRIAL AVAILABILITY

The present invention can be used for advertisement of product and sales conducted by an enterprise etc. providing products and services. According to the above-described information distribution system, the information distribution method, the computer-readable recording medium and the program having the above arrangement and steps, the information on the products and services can be provided to those in demand in a timely and convenient manner.

The invention claimed is:

1. An information distribution system that displays a service information, that includes desired distribution date and time information provided by an information provider from a terminal on at least one of a plurality of displays, the service information including: a display information that represents specific display contents; a display designation information that designates the display on which the display information is displayed; and a display operation designation information for specifying the display operation of the display designated by the display designation information, the system comprising:

a service information collector that collects the service information;

a display program generator that generates a display program of the display designated by the display designation information based on the display operation designation information;

a display program executor for displaying the service information on the display based on the display program generated by the display program generator;
a display controller respectively annexed to the plurality of displays that controls display on the respective displays;
a server connected to the respective display controller through a network, the server including the service information collector, the display program generator and a display program distributor that distributes the display program generated by the display program generator to the display controller, the display controller including the display program executor; and
a registration request distributor that, when the service information is collected by the service information collector, distributes a request for registering a display information contained in the service information to the respective controller,
wherein the display controller has a display information storage that stores the display program and the display information distributed from the server, and the display program executor comprises: a display information finder that seeks a corresponding display information from the display information stored in the display information storage in response to the registration request from the registration request distributor; and an information transmission requesting portion that requests transmission of the display information to the server when the corresponding display information is not found after searching by the display information finder.

2. An information distribution system that displays a service information, that includes desired distribution date and time information provided by an information provider from a terminal on at least one of a plurality of displays, the service information including: a display information that represents specific display contents; a display designation information that designates the display on which the display information is displayed; and a display operation designation information for specifying the display operation of the display designated by the display designation information, the system comprising:
a service information collector that collects the service information;
a display program generator that generates a display program of the display designated by the display designation information based on the display operation designation information;
a display program executor for displaying the service information on the display based on the display program generated by the display program generator;
a display controller respectively annexed to the plurality of displays that controls display on the respective displays; and
a server connected to the respective display controller through a network, the server including the service information collector, the display program generator and a display program distributor that distributes the display program generated by the display program generator to the display controller, the display controller including the display program executor,
wherein the display controller has a display information storage that stores the display program and the display information distributed from the server, and the display program executor comprises: a display information finder that searches corresponding display information from the display information stored in the display information storage based on the distributed display program; and an information transmission requesting portion that requests transmission of the display information to the server when the corresponding display information is not found after searching by the display information finder.

3. An information distribution system that displays a service information, that includes desired distribution date and time information provided by an information provider from a terminal on at least one of a plurality of displays, the service information including: a display information that represents specific display contents; a display designation information that designates the display on which the display information is displayed; and a display operation designation information for specifying the display operation of the display designated by the display designation information, the system comprising:
a service information collector that collects the service information;
a display program generator that generates a display program of the display designated by the display designation information based on the display operation designation information;
a display program executor for displaying the service information on the display based on the display program generated by the display program generator;
a display controller respectively annexed to the plurality of displays that controls display on the respective displays, the display controller comprising a base contents displaying portion that displays a predetermined base contents on the display when there is no display information based on the display program; and
a server connected to the respective display controller through a network, the server including the service information collector, the display program generator and a display program distributor that distributes the display program generated by the display program generator to the display controller, the display controller including the display program executor.

4. An information distribution method that displays a service information, that includes desired distribution date and time information provided by an information provider from a terminal on at least one of a plurality of displays,
the service information including: a display information that represents specific display contents; a display designation information that designates the display on which the display information is displayed; the desired distribution date and time; and a display operation designation information that specifies the display operation of the display designated by the display designation information, the method comprising steps of:
collecting the service information;
generating a display program of the display designated by the display designation information based on the display operation designation information;
displaying the service information on the display based on the display program generated in the display program generating step;
distributing the display program generated in the display program generating step to respective display controllers;
storing the display program and display information distributed in the display program distributing step in a respective display controller corresponding to the display program;

distributing a request for registering the display information contained in the service information when the service information is collected in the service information collecting step;

seeking a corresponding display information stored in the display information storing step based on the registration request in the registration request distribution step; and requesting transmission of the display information to the server when the corresponding display information is not found after search during the display information seeking step, wherein the steps are implemented on a network system comprising: a display controller respectively annexed to the plurality of displays that controls display on the respective displays; and a server connected to the respective display controllers through a network.

5. A program stored in a computer-readable recording medium that implements the information distribution method according to claim 4 by a computer system.

6. A program stored in a computer-readable recording medium that implements the information distribution method according to claim 4.

7. An information distribution method that displays a service information, that includes desired distribution date and time information provided by an information provider from a terminal on at least one of a plurality of displays, the service information including: a display information that represents specific display contents; a display designation information that designates the display on which the display information is displayed; the desired distribution date and time; and a display operation designation information that specifies the display operation of the display designated by the display designation information, the method comprising steps of:

collecting the service information;

generating a display program of the display designated by the display designation information based on the display operation designation information;

displaying the service information on the display based on the display program generated in the display program generating step;

distributing the display program generated in the display program generating step to respective display controllers; and storing the display program and display information distributed in the display program distributing step in a respective display controller corresponding to the display program, wherein the steps are implemented on a network system comprising; a display controller respectively annexed to the plurality of displays that controls display on the respective displays; and a server connected to the respective display controllers through a network, and the display program executing step includes: a display information searching step that searches a corresponding display information from the display information stored in the display information storing step based on the display program distributed and displayed; and an information transmission requesting that requests transmission of the display information to the server when the corresponding display information is not found after searching in the display information searching step.

8. A program stored in a computer-readable recording medium that implements the information distribution method according to claim 7 by a computer system.

9. A program stored in a computer-readable recording medium that implements the information distribution method according to claim 7.

10. An information distribution method that displays a service information, that includes desired distribution date and time information provided by an information provider from a terminal on at least one of a plurality of displays, the service information including: a display information that represents specific display contents; a display designation information that designates the display on which the display information is displayed; the desired distribution date and time; and a display operation designation information that specifies the display operation of the display designated by the display designation information, the method comprising steps of:

collecting the service information;

generating a display program of the display designated by the display designation information based on the display operation designation information;

displaying the service information on the display based on the display program generated in the display program generating step; and displaying a predetermined base contents on the display when there is no display information based on the display program.

11. A program stored in a computer-readable recording medium that implements the information distribution method according to claim 10 by a computer system.

12. A program stored in a computer-readable recording medium that implements the information distribution method according to claim 10.

* * * * *

UNITED STATES PATENT AND TRADEMARK OFFICE
CERTIFICATE OF CORRECTION

PATENT NO. : 7,076,522 B2
APPLICATION NO. : 10/069024
DATED : July 11, 2006
INVENTOR(S) : Tatsuya Chino and Hiroshi Matsumoto It is certified that error appears in the above-identified patent and that said Letters Patent is hereby corrected as shown below:

On Title Page, Item (30)
Foreign Application Priority Data

Change:
  "Jun. 30, 2000  (JP)  .........2000-199393"
to
  --Jun. 30, 2000  (JP)  .........2000-199363--

Signed and Sealed this

Seventh Day of November, 2006

JON W. DUDAS
*Director of the United States Patent and Trademark Office*